(12) United States Patent  
Yamaguchi

(10) Patent No.: US 8,982,248 B2  
(45) Date of Patent: Mar. 17, 2015

(54) IMAGE PROCESSING APPARATUS, IMAGING APPARATUS, IMAGE PROCESSING METHOD, AND PROGRAM

(75) Inventor: Yuya Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 337 days.

(21) Appl. No.: 13/537,475

(22) Filed: Jun. 29, 2012

(65) Prior Publication Data

US 2013/0010163 A1 Jan. 10, 2013

(30) Foreign Application Priority Data

Jul. 6, 2011 (JP) ................................. 2011-150401

(51) Int. Cl.
*H04N 9/64* (2006.01)
*H04N 9/04* (2006.01)

(52) U.S. Cl.
CPC .................................... *H04N 9/045* (2013.01)
USPC ......................................................... 348/242

(58) Field of Classification Search
CPC ....... H04N 9/045; H04N 9/646; H04N 5/217; H04N 2209/046; G06T 3/4015
USPC ......................................................... 348/242
See application file for complete search history.

(56) References Cited

U.S. PATENT DOCUMENTS

2010/0214446 A1* 8/2010 Watarai .................... 348/231.99
2011/0242372 A1* 10/2011 Kosaka .......................... 348/242
2012/0069226 A1* 3/2012 Sugimori ....................... 348/242

FOREIGN PATENT DOCUMENTS

JP 2000-299874 10/2000
JP 2010-219683 9/2010

* cited by examiner

*Primary Examiner* — Ahmed A Berhan
*Assistant Examiner* — Fayez Bhuiyan
(74) *Attorney, Agent, or Firm* — Frommer Lawrence & Haug LLP; Williams S. Frommer; Ellen Marcie Emas

(57) ABSTRACT

An image processing apparatus includes: an aberration amount generation unit that calculates an aberration amount of a different color component signal with reference to a position of a color component signal of a criterion color having pixels larger in number than a different color included in image data, based on a luminance value of a pixel signal included in the image data; and a correction unit that generates a color difference signal from the different color component signal and the color component signal of the criterion color and corrects chromatic aberration of the color component signal of the different color present between pixels of the criterion color using the color difference signal based on the aberration amount.

6 Claims, 17 Drawing Sheets

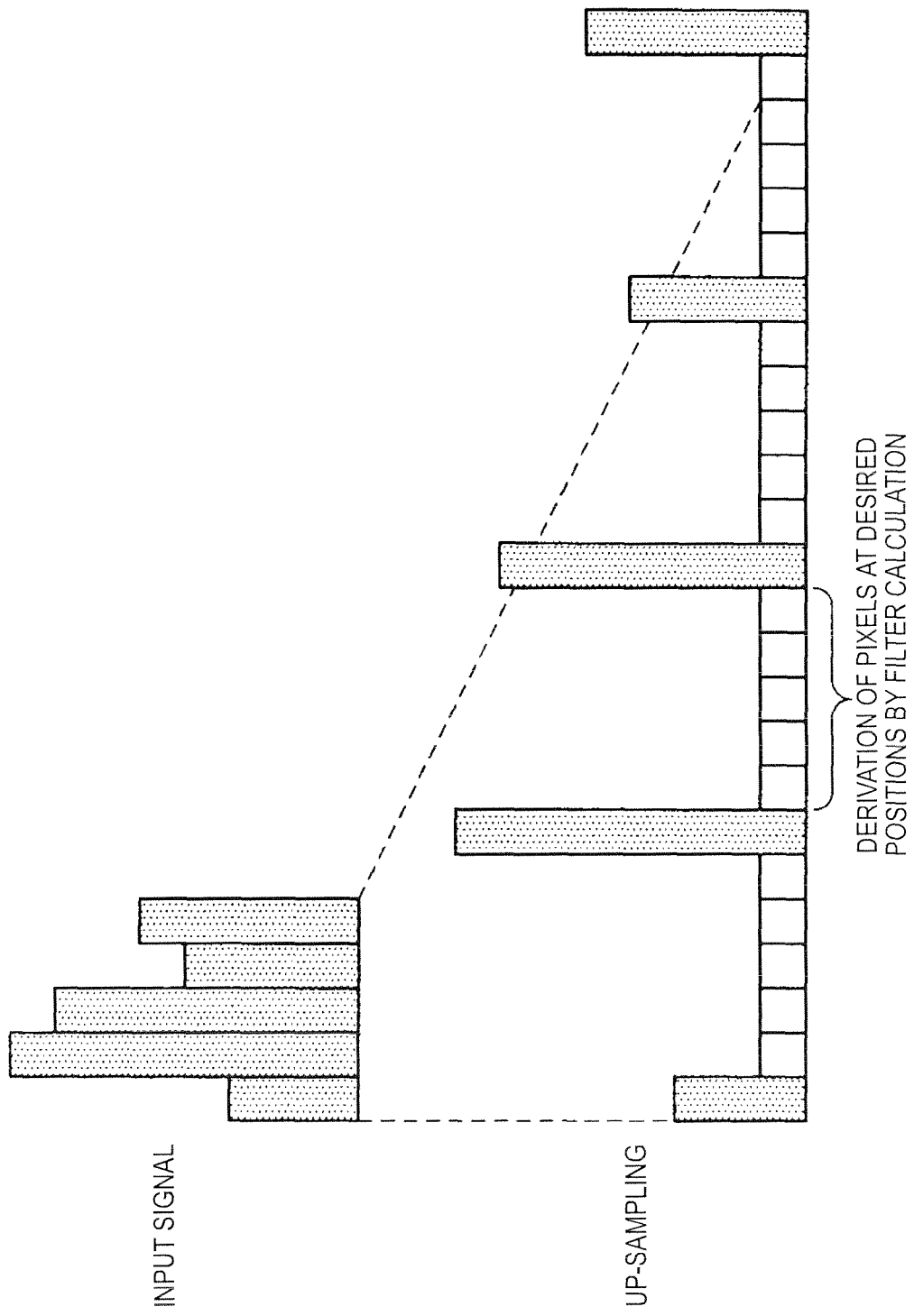

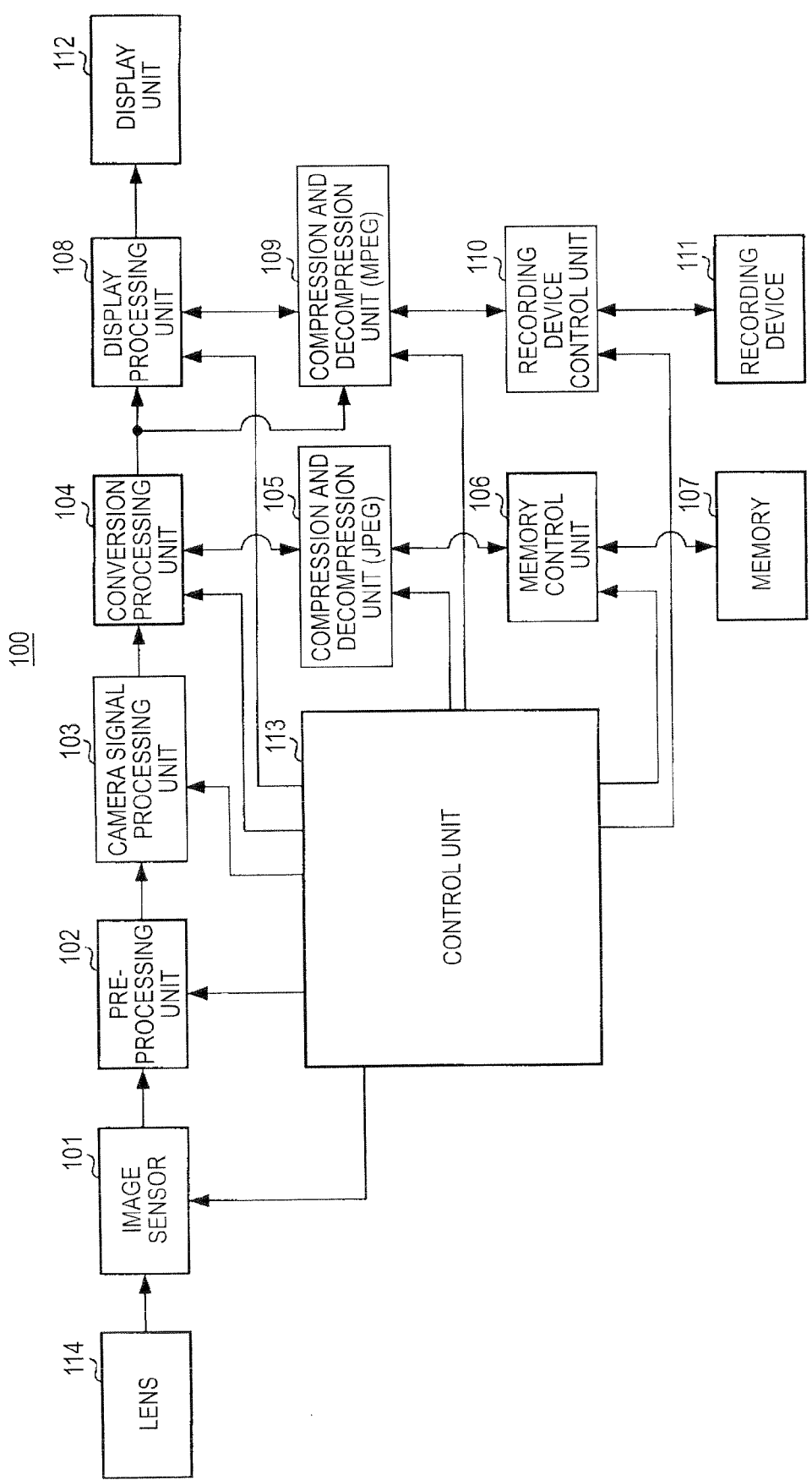

● L

IMAGE PROCESSING APPARATUS, IMAGING APPARATUS, IMAGE PROCESSING METHOD, AND PROGRAM

FIELD

The present technology relates to an image processing apparatus, an imaging apparatus, an image processing method, and a program, and more particularly, to a technology of correcting chromatic aberration of magnification in a single-plate type color sensor camera.

BACKGROUND

In imaging apparatuses such as still cameras or video cameras, chromatic aberration of magnification is known to occur due to an expanded pointing image in light passing through a lens due to an influence of a point spread function (PSF) of each color. The chromatic aberration of magnification occurs due to a difference in the size of an image since the refractive index of a lens is different depending on a wavelength of the visible light and the focal distance is thus different.

When a white point light source is photographed with a lens in which chromatic aberration of magnification occurs, the neighboring portion of a screen is colored with the colors of the rainbow and thus the light source is photographed to grow in a radiation direction. Even in a normal subject, a color deviation is prominently seen particularly in the edge portion of an image.

Hitherto, calculating and correcting deviation (aberration amount) in horizontal and vertical directions in each of RGB (red, green, and blue) has been performed as a method of correcting a color aberration of magnification (for example, see Japanese Unexamined Patent Application Publication No. 2010-219683 and Japanese Unexamined Patent Application Publication No. 2000-299874). In general, the correction of the color aberration of magnification is performed before color separation (color interpolation for a single plate: de-Bayer). Various methods have been examined as a method of detecting a color aberration of magnification from RAW data. In the correction of the color aberration of magnification, color shifting has been performed only based on information regarding a single color such as R (red) or B (blue).

SUMMARY

A color filter used in a single-plate type color image sensor is formed in an array shape on an imaging device. In the arrangement of the color filter (color filter array) formed in the array shape, a Bayer pattern in which G (green), which makes a large contribution to a luminance signal is arranged in a check pattern and R and B are arranged in the remaining portions of the check pattern is representatively used. FIG. 1 shows pixels of RGB colors arranged in the Bayer arrangement. In the Bayer arrangement, there are twice as many pixels obtained by a G color filter as there are obtained by an R or B color filter, and thus the pixels obtained by the R or B color filter are small in number.

Hereinafter, a method of correcting a color aberration of magnification according to the related art will be described with reference to FIGS. 2A to 2C.

For example, R and G of the Bayer arrangement (see FIG. 2A) that is formed by RGB will be focused on. L denotes an image center (corresponding to an optical axis). A lens in which a color aberration of magnification occurs images R at a position distant from G by an aberration amount (see FIG. 2B). In the related art, when the color aberration of magnification of R is corrected, up-sampling (expansion process) is performed on an image using only a single color (R) (see FIG. 2C) and pixel shifting is performed with decimal accuracy to perform a process of returning R to right positions. As shown in FIG. 3, up-sampling is a process of performing filter calculation on input signals (for example, R, G, and B signals) and deriving signals of pixels located at desired positions.

The number of R or B pixels obtained by a single-plate type color image sensor is small and the frequency which can be estimated by the up-sampling is limited, as apparent from a sampling theorem. In general, the frequency characteristics of a camera including the single-plate type color image sensor are determined by a resolution limit based on the number of G pixels in many cases. Therefore, when the up-sampling is performed on R or B using only single-color information, a high frequency near the limit resolution of G may not be reproduced, and the edge of R or B may be blurred or a false color may be shown in the vicinity of the edge of R or B in some cases. That is, when the pixels before the shift of R or B are interpolated in the process of correcting the color aberration of magnification of R or B, the high frequency may not be realized and the edges of R or B may not be corrected appropriately.

It is therefore desirable to provide a technology capable of appropriately correcting the edges of colors other than a basic color, for example, the edges of R or B rather than G of an image in which a color aberration of magnification occurs.

According to an embodiment of the present technology, an aberration amount of a different color component signal with reference to a position of a color component signal of a criterion color included in image data, is first calculated based on a luminance value of a pixel signal included in the image data. Then, a color difference signal is generated from the different color component signal and the color component signal of the criterion color and chromatic aberration of the color component signal of the different color present between pixels of the criterion color is corrected using the color difference signal based on the aberration amount.

In the embodiment of the present technology, a color difference is generated from a difference between the different color (for example, R or B) and the criterion color (for example, G) in an image (RAW data) including a high-frequency component (edge) obtained from a single-plate type image sensor. The chromatic aberration of the different color is corrected using the color difference based on the aberration amount. Here, since the number of pixels of the criterion color is larger than the number of the different color and the chromatic difference is corrected using the color difference with a frequency lower than that of the different color, the correction accuracy is high and the pixel is not blurred.

According to the embodiment of the present technology described above, it is possible to appropriately correct the edges of colors other than a basic color, for example, the edges of R or B rather than G of an image in which a color aberration of magnification occurs.

BRIEF DESCRIPTION OF THE DRAWINGS

FIG. 3 is a diagram illustrating up-sampling;

FIG. 4 is a block diagram illustrating an imaging apparatus according to a first embodiment;

DETAILED DESCRIPTION

Figure 1:
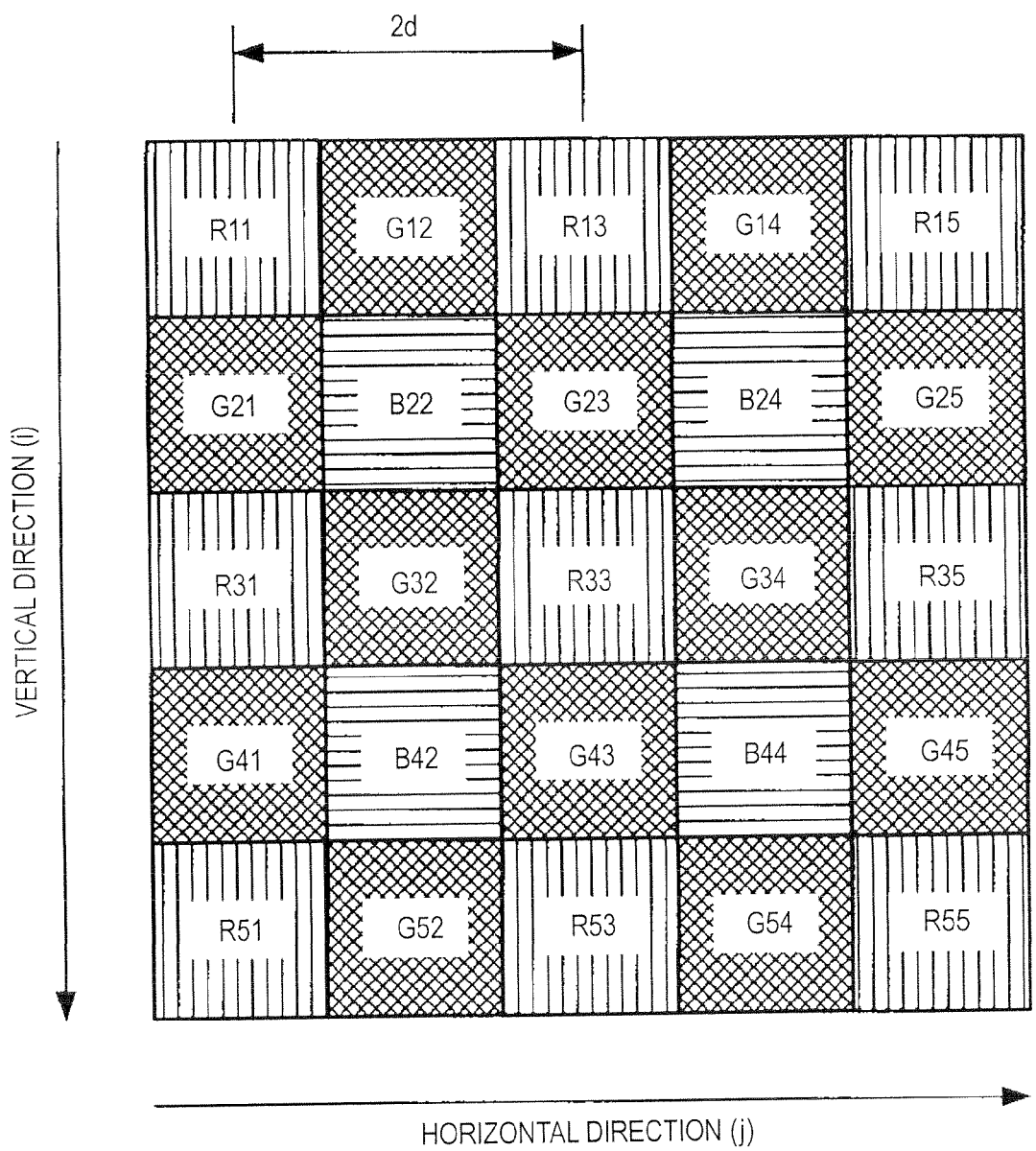
FIG. 1 is a diagram illustrating pixels of RGB colors disposed in a Bayer arrangement.

Hereinafter, embodiments of the present technology will be described with reference to the accompanying drawings. In the specification and the drawings, the same reference numerals are given to constituent elements having substantially the same function or configuration and the description thereof will not be repeated.

The description will be made in the following order.

1. First Embodiment (Correction Unit: Example of Correction of Color Aberration of Magnification Using G Color Difference)

1.1. Example of Application to Bayer Arrangement (First Example)

1.2. Example of Application to Double-density Bayer Arrangement (Second Example)

1.3. Example of Application to ClearVid Arrangement (Third Example)

2. Second Embodiment (Correction Unit: Example of Correction of Color Aberration of Magnification Using G Color Difference and Color Separation)

2.1. Example of Application to Bayer Arrangement (First Example)

2.2. Example of Application to Double-density Bayer Arrangement (Second Example)

2.3. Example of Application to ClearVid Arrangement (Third Example)

1. First Embodiment

Overview of Present Technology

In a natural image, it is generally known that the frequency of chromatic aberration signal is not higher than the frequency of an R or B signal (this opinion is also applied to color separation or compression and many algorithms have been developed based on this opinion).

For example, a signal processing method using a correlation between local color component signals is disclosed in the following document.

"D. R. Cok: "Signal Processing Method and Apparatus for Producing Interpolated Chrominance Values in a Sampled Color Image Signal," U.S. Pat. No. 4,642,678 (1987) (CHBI)"

Therefore, since the frequency band of a signal to be estimated is lower in an interpolation method using a G color difference signal than in an interpolation method using a signal of a single color R or B, it is considered that a higher interpolation accuracy can be obtained. In an embodiment of the present technology, this idea is applied to correction of chromatic aberration of magnification, so that correction of the chromatic aberration of magnification on an image obtained from an image sensor with a pixel arrangement of RGB is performed using a G color difference signal.

In the embodiment of the present technology, when the chromatic aberration of magnification of R or B is corrected, pixels before the shift of R or B are not interpolated, but G, intentionally shifted to the deviated position of R or B, is tentatively generated. When G, intentionally shifted to the positions of R and B before the deviation of R and B, is interpolated, a G color difference which is the same as R and B in number can be obtained. G color difference signal before the shift of the pixels (target pixel) is interpolated using the G color difference to interpolate R or B at the deviated positions.

When the pixels before the shift are set at the position of the arrangement of the single-plate color image sensor, the image of the RAW data corrected by the aberration amount can be obtained. Therefore, when the pixels are set at the positions of output pixels, the interpolation of the G color difference in a color separation process can be also combined.

In the following description, R, G, and B pixels are referred to as "R", "G", and "B", respectively, and R, G, and B signals are referred to as "R", "G", and "B", respectively. An R–G color difference signal or a BG color difference signal is referred to as a "G color difference."

[Example of Configuration of Imaging Apparatus]

An example of the configuration of an imaging apparatus according to an embodiment of the present technology will be described.

The imaging apparatus according to the embodiment of the present technology is not limited to, for example, a digital still camera in which a lens is exchangeable or is not exchangeable, but may be applied to an apparatus that has an imaging function, such as a camcorder, a portable telephone, or a PDA (Personal Digital Assistant). Further, the imaging apparatus according to the embodiment of the present technology is applicable to a processing apparatus or a recording apparatus in which an imaging signal is processed by a small-size camera for a video phone or game software connected to a personal computer or the like.

Each processing function of the imaging apparatus described below can be mounted on hardware or software. Further, image processing described in the specification is a process performed on R, G, and B in input data (RAW data) in signal processing of the imaging apparatus.

First, the configuration of the imaging apparatus including an image processing device according a first embodiment of the present technology will be described. FIG. 4 is a block diagram illustrating an imaging apparatus 100 according to this embodiment.

The imaging apparatus 100 shown in FIG. 4 is a video camera that is capable of recording video data in a storage medium. For example, the imaging apparatus 100 includes an image sensor 101, a pre-processing unit 102, a camera signal processing unit 103, a conversion processing unit 104, an compression and decompression unit (JPEG) 105, a memory control unit 106, a memory 107, a display processing unit 108, a compression and decompression unit (MPEG) 109, a recording device control unit 110, a recording device 111, a display unit 112, a control unit 113, and an imaging lens 114.

The imaging lens 114 is a lens group that collects incident light from a subject and provides a subject image to the image sensor 101 described below. When light from the subject passes through the imaging lens 114, the refractive index of the light is different according to the length of the wavelength of the visible light. Therefore, since the focal distances of respective colors are different from each other and thus the imaging positions are deviated, chromatic aberration of magnification occurs. Further, since each color has a dispersion caused by a point spread at the imaging position by a point spread function (PSF) of the imaging lens 114 and a difference in the width of the dispersion between the colors becomes a false color, the chromatic aberration of magnification occurs.

The image sensor 101 converts incident light from a subject received via an optical system (for example, including the imaging lens 114, an infrared ray removal filter, an optical low-pass filter, or a color filter) into an electric signal through photoelectric conversion. For example, a CMOS (Complementary Metal Oxide Semiconductor) single-plate type imaging element is used as the image sensor 101. When the CMOS imaging element is used, photodiodes, row and column selection MOS transistors, signal lines, and the like are arranged in a two-dimensional shape to form a vertical scanning circuit, a horizontal scanning circuit, a noise removal circuit, a timing generation circuit, and the like. Further, a CCD (Charge Coupled Device) imaging element may be used as the image sensor 101.

For example, the image sensor 101 reads a signal at a frame rate of 60 fps (field/second) which is a specification of an NTSC scheme. The image sensor 101 includes a CDS (Correlated Double Sampling) and an A/D converter. The image sensor 101 outputs imaging data.

The pre-processing unit 102 performs an optical correction process, such as shading correction, on the imaging data output from the image sensor 101 and outputs a digital image signal. The pre-processing unit 102 is an example of an image processing device and performs detection or correction of chromatic aberration of magnification described below.

The camera signal processing unit 103 performs camera signal processing on the imaging data from the pre-processing unit 102, such as color separation (synchronization process) white balance correction, aperture correction, gamma correction, or YC generation.

The conversion processing unit 104 performs display thinning and size adjustment to convert the image signal received from the camera signal processing unit 103 to a signal with a frame rate and a screen size suitable for display of the display unit 112. The display thinning is performed when the signal is output to the display processing unit 108.

The compression and decompression unit (JPEG) 105 performs compression and encoding processes on the imaging data from the conversion processing unit 104 in accordance with an encoding scheme of a still image having, for example, the JPEG (Joint Photographic Experts Group) standard. Further, the compression and decompression unit (JPEG) 105 performs compression and decoding processes on the encoded data of the still image supplied from the memory control unit 106. The memory control unit 106 writes or reads the image data in or from the memory 107. The memory 107 is a buffer memory that temporarily stores the image data received from the memory control unit 106 in accordance with a FIFO (First In First Out) scheme. For example, the memory 107 is an SDRAM (Synchronous Dynamic Random Access Memory).

The display processing unit 108 generates an image signal to be displayed on the display unit 112 from the image signal received from the conversion processing unit 104 or the compression and decompression unit (MPEG) 109, and then transmits the image signal to the display unit 112 so that the image signal is displayed. The display unit 112 is configured by, for example, an LCD (Liquid Crystal Display). For example, the display unit 112 displays a camera through-image being photographed or an image of data recorded in the recording device 111.

The compression and decompression unit (MPEG) 109 performs compression and encoding processes on the image data received from the conversion processing unit 104 in accordance with a moving image encoding scheme such as MPEG (Moving Picture Experts Group). Further, compression and decompression unit 109 performs decompression and decoding processes on the encoded data of the moving image supplied from the recording device 111 and outputs the decompressed and decoded moving image to the display processing unit 108. The display unit 112 displays the moving image received from the display processing unit 108.

The control unit 113 is, for example, a microcomputer that includes a CPU (Central Processing Unit), a ROM (Read Only Memory), and a RAM (Random Access Memory). The control unit 113 controls each constituent element of the imaging apparatus 100 by executing a program stored in the ROM or the like.

[Example of Configuration of Pre-processing Unit]

Next, the pre-processing unit 102 according to this embodiment will be described.

Figure 5:
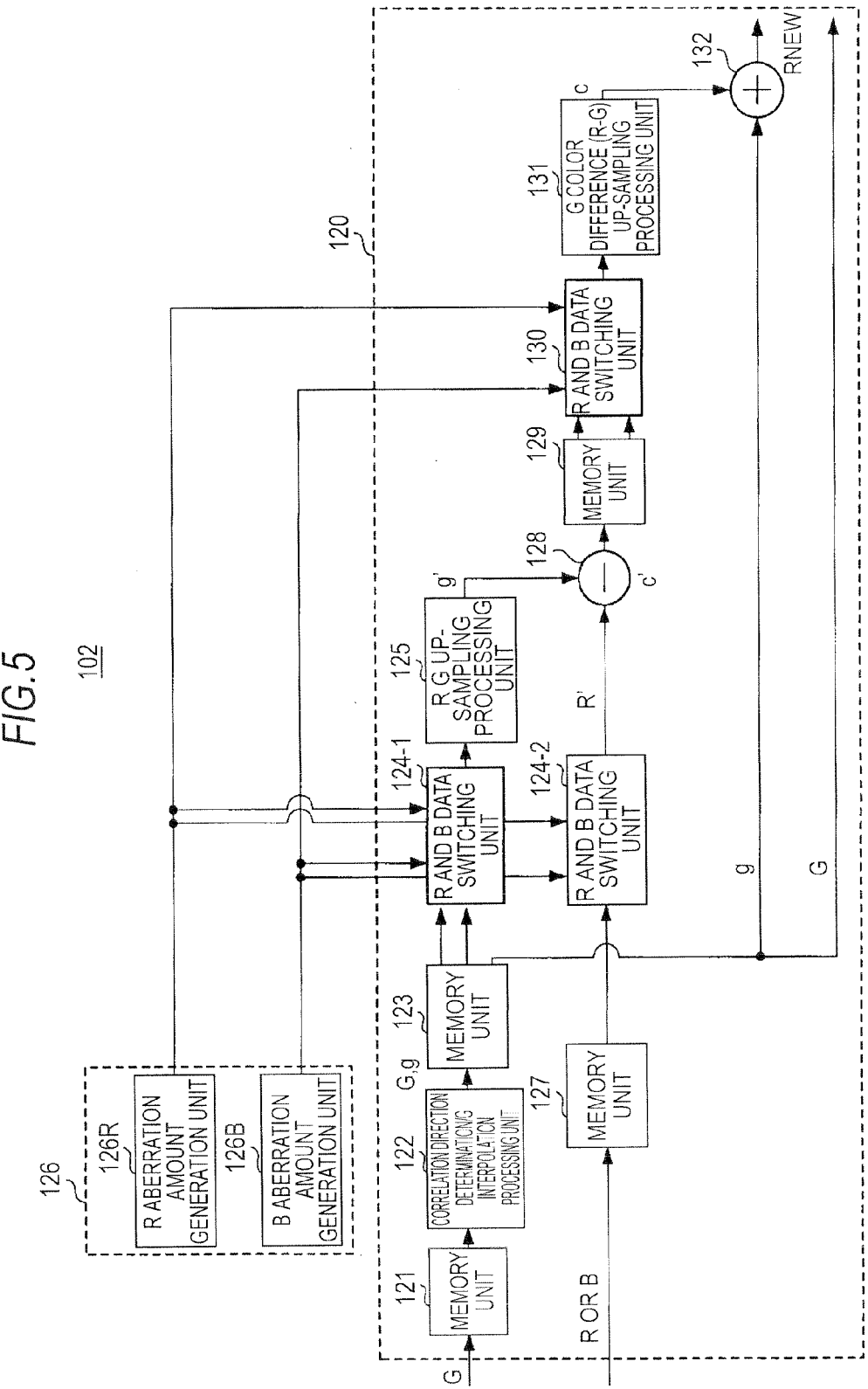
FIG. 5 is a block diagram illustrating the internal configuration of a pre-processing unit shown in FIG. 4.

FIG. 5 is a block diagram illustrating the internal configuration of the pre-processing unit. A block configuration will be described on the assumption that a process of correcting chromatic aberration of magnification is performed on R among RGB pixels. However, the embodiment is, of course, applicable to a block configuration in which a process of correcting chromatic aberration of magnification is performed on B.

The pre-processing unit 102 includes a correction unit 120 and an aberration amount generation unit 126.

For example, the aberration amount generation unit 126 includes an edge detection unit, a color deviation amount detection unit, and a magnification calculation unit. The edge detection unit detects an edge portion (high-frequency component) in an image, which is based on the image data, and a change direction of a luminance value of the edge portion based on a luminance value of the pixel signal included in the image data. The color deviation amount detection unit calculates a correlation between two color component signals included in the image data in the edge portion to detect a color deviation amount. The magnification calculation unit calculates a scaling magnification (aberration amount) of another color component signal with reference to one color component signal based on the distance between the color deviation amount and an image center (corresponding to an optical axis).

Thus, the aberration amount generation unit 126 generates a scaling magnification (aberration amount), for example, by applying an aberration model (polygonal equation) on each of R and B based on how far away a currently processed pixel is from the image center (image height).

In the example of FIG. 5, the aberration amount generation unit 126 includes an R aberration amount generation unit 126R and a B aberration amount generation unit 126B. The R aberration amount generation unit 126R calculates a scaling magnification (aberration amount) of the R signal with reference to the G signal. The B aberration amount generation unit 126B calculates a scaling magnification (aberration amount) of the B signal with reference to the G signal.

In the aberration amount generation unit 126, it is necessary to calculate the aberration amount in advance as the presupposition of the correction of the chromatic aberration of magnification. Therefore, the aberration amount (scaling magnification) of an image is estimated from the image so that a similar method to those used in Japanese Unexamined Patent Application Publication No. 2010-219683, Japanese Unexamined Patent Application Publication No. 2000-299874, or the like is used. However, the embodiment of the present technology is not limited to this example, but the characteristics of a lens may be measured in advance to determine the aberration amount.

The correction unit 120 corrects the chromatic aberration using a correction magnification which is based on the scaling magnification (aberration amount) of another color component signal (in this example, the R or B signal) generated by the aberration amount generation unit 126 with reference to one color component signal (in this example, the G signal). At this time, the correction unit 120 may correct the chromatic aberration of an edge portion in correspondence with the change direction of the luminance value.

The correction unit 120 includes a memory unit 121, a correlation direction determination/G interpolation processing unit 122, a memory unit 123, an R and B data switching unit 124, an R G up-sampling processing unit 125, a memory unit 127, and a subtracter 128. A memory unit 129 further includes an R and B data switching unit 130, a G color difference (R−G) up-sampling processing unit 131, and adder 132.

The correlation direction determination/G interpolation processing unit 122 interpolates a G signal to the phase of an R or B signal using the G signal received from the memory unit 121. That is, the correlation direction determination/G interpolation processing unit 122 generates an interpolation G signal (hereinafter, referred to as "interpolation G") at the position of an R or B pixel, for example, by calculating a weighted average value of the pixel values of the G pixels in the vicinity of the R or B pixel. Further, the correlation direction determination/G interpolation processing unit 122 detects a correlation direction to be used in an adaptive interpolation process described below.

The memory unit 123 stores a non-interpolated G signal or an interpolated G signal (g) received from the correlation direction determination/G interpolation processing unit 122.

The R and B data switching unit 124-1 selects a pixel value (G' signal) of the G pixels in the vicinity of R' located at a deviated position based on the R aberration amount generated by the R aberration amount generation unit 126R from the memory 123 and supplies the selected pixel value to the R G up-sampling processing unit 125 of the rear stage. When the process of correcting the chromatic aberration of magnification is performed on B, the same process is performed based on the B aberration amount generated by the B aberration amount generation unit 126B.

The R and B data switching unit 124-2 selects a pixel value of (R' signal) of R' located at a deviated position based on the R aberration amount generated by the R aberration amount generation unit 126R from the memory unit 127 and supplies the selected pixel value to the subtracter 128 of the rear stage. When the process of correcting the chromatic aberration of magnification is performed on B, the same process is performed based on the B aberration amount generated by the B aberration amount generation unit 126B.

The R G up-sampling processing unit 125 performs the up-sampling on the pixel value (G' signal) of the G pixels, which is selected by the R and B data switching unit 124-1, in the vicinity of R' located at the deviated position and derives a g' signal with the same phase as an R' signal located at a position separated by the aberration amount. Further, the R G up-sampling processing unit 125 functions as a B G up-sampling processing unit when R aberration amount data is switched to B aberration amount data.

As the up-sampling method, there is a method of applying a known static filter, and calculation is performed applying a filter such as bilinear, bicubic, b-spline, or lanczos. An optimum filter may be selected by determining a constraint (load) of software or hardware and a balance of an image quality.

To improve the performance of the up-sampling, the R G up-sampling processing unit 125 performs interpolation through switching filter calculation on a filter adaptively by applying correlation direction detection in advance to the position of R or B before the up-sampling. Thus, the high-quality of the image can be achieved. For example, as the adaptive interpolation process, there are processes such as zigzag interpolation which is often used in a de-Bayer process.

Further, an edge direction interpolation method of determining the directivity of an edge and performing interpolation may be used. For example, when a G signal is interpolated at the position of B, a preferred interpolation direction is determined on the view of the pixels around B. Specifically, gradients $\Delta H_{i,j}$ and $\Delta V_{i,j}$ of G in the horizontal ($H_{i,j}$) and vertical ($V_{i,j}$) directions are calculated using Equation (1) and Equation (2) below. As expressed in Equation (3) and Equation (4), when the gradients $\Delta H_{i,j}$ and $\Delta V_{i,j}$ are compared with each other and one of the gradients $\Delta H_{i,j}$ and $\Delta V_{i,j}$ is equal to or less than a constant threshold value, the average value of the adjacent pixels with the smaller gradient is used. Further, as expressed in Equation (5), when the gradients $\Delta HV_{i,j}$ and $\Delta V_{i,j}$ are the same as each other, the average in both directions is used.

$$\Delta H_{i,j} = |G_{i,j-1} - G_{i,j+1}| \quad (1)$$

$$\Delta V_{i,j} = |G_{i-1,j} - G_{i+1,j}| \quad (2)$$

$$g_{i,j} = gh_{i,j} = \frac{G_{i,j-1} + G_{i,j+1}}{2}, \text{ if } \Delta H_{i,j} < \Delta V_{i,j} \quad (3)$$

$$g_{i,j} = gv_{i,j} = \frac{G_{i-1,j} + G_{i+1,j}}{2}, \text{ if } \Delta H_{i,j} > \Delta V_{i,j} \quad (4)$$

$$g_{i,j} = \frac{gh_{i,j} + gv_{i,j}}{2}, \text{ if } \Delta H_{i,j} = \Delta V_{i,j} \quad (5)$$

The memory unit 127 outputs the R or B signal (that is, the R' or B' signal located at the position separated by the aberration amount) in response to the switch between the R aberration amount data and the B aberration amount data by the R and B data switching unit 124.

When the R and B data switching unit 124 switches the aberration amount data to the R aberration amount data, the subtracter 128 obtains a difference between the g' signal received from the R G up-sampling processing unit 125 and the R' signal received from the memory unit 127 and generates a G color difference (c'=R'−g'). Further, the aberration amount data is switched to the B aberration amount data, a G color difference (c'=B'−g') is generated.

The memory unit 129 stores the G color difference (c'=R'−g') received from the subtracter 128.

As in the R and B data switching unit 124, the R and B data switching unit 130 switches between the R aberration amount data and the B aberration amount data and supplies the result to the G color difference (R−G) up-sampling processing unit 131 of the subsequent stage.

When the R and B data switching unit 130 switches the aberration amount data to the R aberration amount data, the G color difference (R−G) up-sampling processing unit 131 performs the up-sampling on the G color difference (c') to derive a G color difference (c) at the original aberration amount (corresponding to the aberration amount) separation position of R. When the R and B data switching unit 130 switches the aberration amount data to the B aberration amount data, the G color difference (R−G) up-sampling processing unit 131 functions as a G color difference (B−G) up-sampling processing unit.

Here, to improve the performance of the up-sampling, as in the R G up-sampling processing unit 125, the G color difference (R−G) up-sampling processing unit 131 may also perform the adaptive filter calculation based on the correlation direction detection of the color difference signal before the up-sampling.

The adder 132 adds the g signal generated by the correlation direction determination/G interpolation processing unit 122 and the G color difference (c) generated by the G color difference (R−G) up-sampling processing unit 131 to obtain an R signal (Rnew=c+g) subjected to the chromatic aberration of magnification. Further, the correction unit 120 obtains a non-interpolated G signal stored in the memory unit 123. Further, when the aberration amount data can be switched to the B aberration amount data, the correction unit 120 obtains a B signal (Bnew=c+g)

When an image is read from the upper left of the image at a predetermined frame rate through raster scanning, one of R, B, and G is input per pixel into the image generated by a single-plate type image sensor. The data is stored in each memory unit in FIG. 5 and each block is processed. When the block is realized by hardware, a necessary process may be performed on each block for one pixel in order to process data without interruption. Therefore, a correlation direction determination/G interpolation process, a G up-sampling process, and a G color difference up-sampling process may be also performed for each pixel.

The capacity of each memory unit has to be set in consideration of the maximum value of the aberration amount (correction amount). As the capacity of the memory unit is larger, the deviation in a large chromatic aberration of magnification is further corrected.

1.1. Example of Application to Bayer Arrangement

First Example

Method of Correcting Chromatic Aberration of Magnification

Next, a method of correcting the chromatic aberration of magnification will be described according to a first example of the first embodiment.

Figure 6:
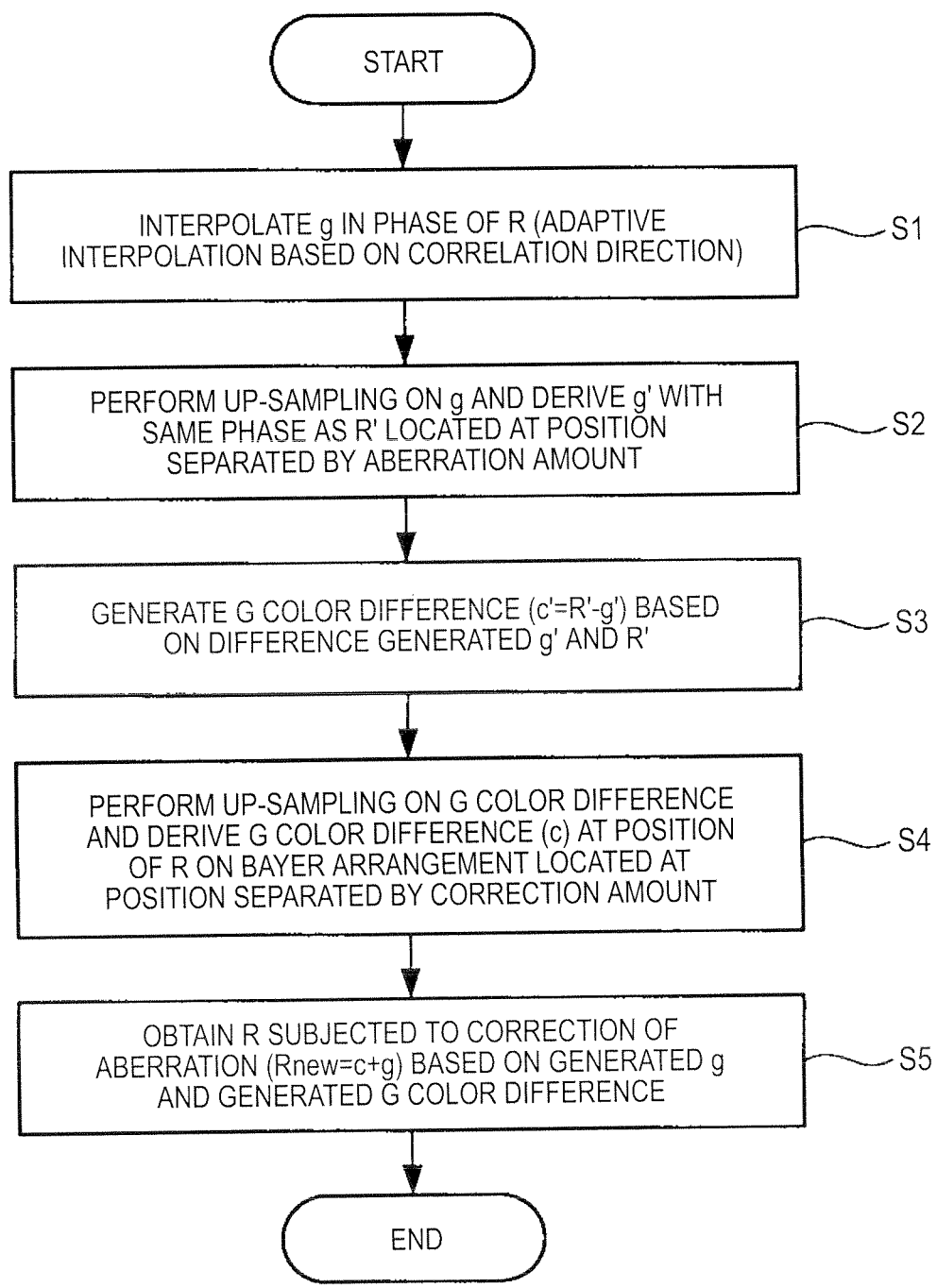
FIG. 6 is a flowchart illustrating a process of correcting a color aberration of magnification on a Bayer arrangement according to a first example of the first embodiment.
Figure 7C:
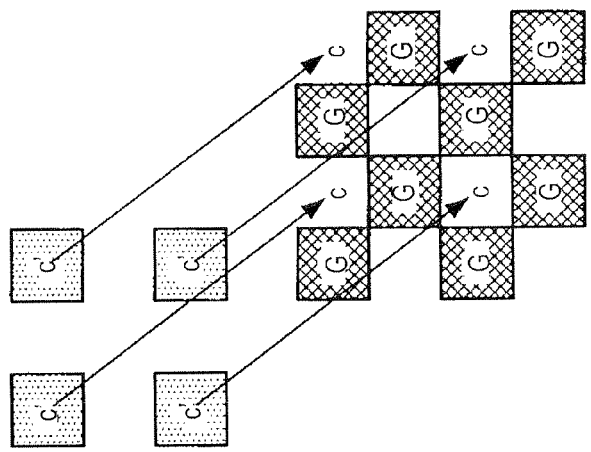
FIGS. 7A to 7C are diagrams illustrating the process of correcting the color aberration of magnification on the Bayer arrangement according to the first example of the first embodiment.
Figure 7B:
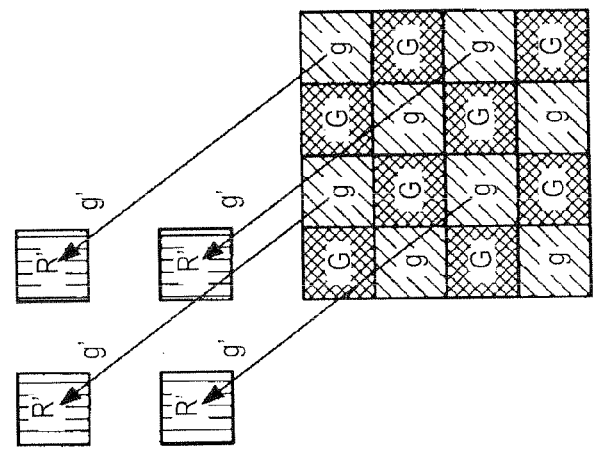
Figure 7A:
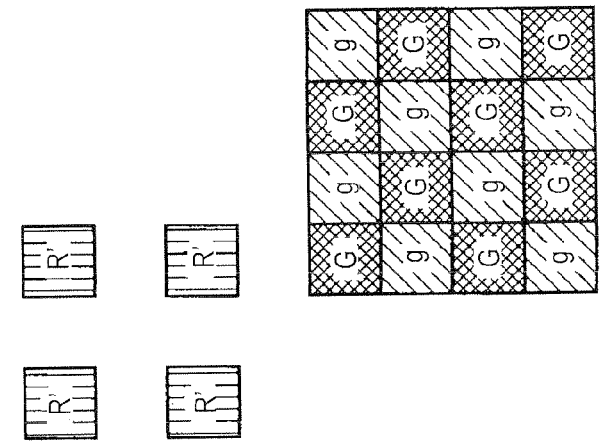

FIG. 6 is a flowchart illustrating the process of correcting the chromatic aberration of magnification in the Bayer arrangement according to the first example of the first embodiment. FIGS. 7A to 7C are diagrams illustrating the process of correcting the chromatic aberration of magnification in the Bayer arrangement according to the first example of the first embodiment.

In this embodiment, the detection and the correction of the chromatic aberration of magnification are performed on the RAW data output from the image sensor 101. In the Bayer arrangement, the G pixels are twice the R or B pixels in number and are arranged in a check pattern. Thus, the R and B pixels are arranged in a lattice shape (see FIG. 1). The embodiment of the present technology is not limited to the Bayer arrangement. However, since the Bayer arrangement is simple, the Bayer arrangement will be described as an example. In other single-plate type image sensors, the same process can be performed when the most pixels are G and the other pixels are R and B on the single-plate type image sensor.

Hereinafter, a case in which the process of correcting the chromatic aberration of magnification is performed on R of the Bayer arrangement will be described.

As a presupposition of the process of correcting the chromatic aberration of magnification in FIG. 6, the R aberration amount generation unit 126R of the pre-processing unit 102 calculates a scaling magnification (aberration amount) of the R signal with reference to the G signal based on the color deviation amount and the distance from an image center (corresponding to an optical axis).

Figure 2C:
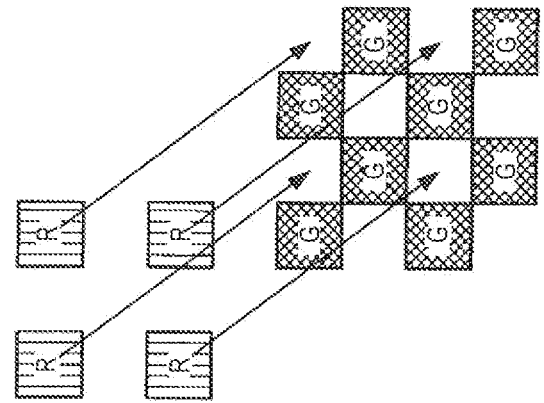
FIGS. 2A to 2C are diagrams according to the related art.
Figure 2B:
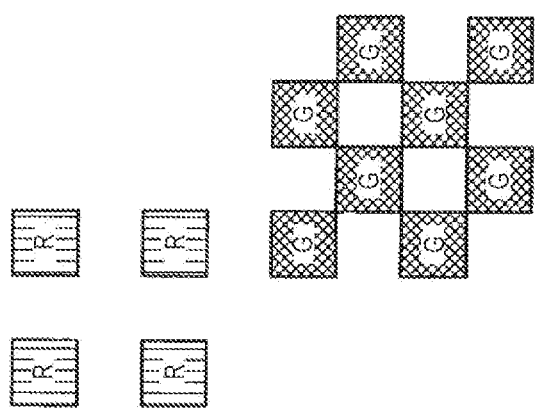
Figure 2A:
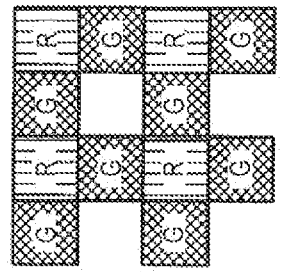

First, the correlation direction determination/G interpolation processing unit 122 generates an interpolation G signal (g) at the positions (see FIGS. 2A and 7A) of the R pixels of the Bayer arrangement to be interpolated from G in the vicinity of the positions of the R pixels (step S1). At this time, the adaptive interpolation may be performed based on the correlation direction.

Next, the R G up-sampling processing unit 125 performs the up-sampling on the pixels (G' signals) of the G pixels in the vicinity of R' located at the deviated positions supplied from the R and B data switching unit 124 and derives the g'signal with the same phase as R' located at the position separated by the aberration amount (step S2).

Next, the subtracter 128 obtains a difference between the g' signal received from the R G up-sampling processing unit 125 and the R' signal received from the memory unit 127 and generates a G color difference (c'=R'−g') (step S3).

Then, the G color difference (R−G) up-sampling processing unit 131 performs the up-sampling on the G color difference (c') based on the R aberration amount data supplied from the R and B data switching unit 130 and derives the G color difference (c) at the original position of R located at the position separated by a correction amount (corresponding to the aberration amount) (step S4).

Finally, the adder 132 adds the g signal generated by the correlation direction determination/G interpolation processing unit 122 and the G color difference (c) generated by the G color difference (R−G) up-sampling processing unit 131 and performs pixel shift to obtain the R signal (Rnew=c+g) subjected to the correction of the chromatic aberration of magnification (step S5).

The pixel shift is performed on all R on the Bayer arrangement and the correction of the chromatic aberration of magnification is performed. The pixel shift is also performed on B to obtain the B signal (Bnew) subjected to the correction of the chromatic aberration of magnification.

In the first example of this embodiment, the correction of the chromatic aberration of magnification can be realized with high accuracy without blurring the pixels (for example, R or B) other than G, even when the correction of the chromatic aberration of magnification is performed on the image (RAW data) including a high-frequency component (edge) obtained from the single-plate image sensor (with the Bayer arrangement).

[Comparison between Corrections of Chromatic Aberration of Magnification According to Embodiment of Present Technology and Related Art]

Figure 8:
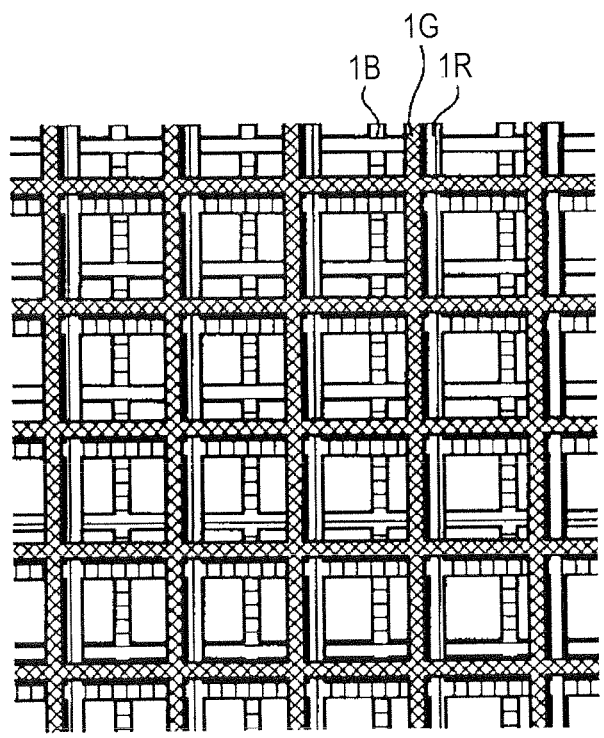
FIG. 8 is a diagram illustrating an example of an image in which a color aberration of magnification occurs.
Figure 9:
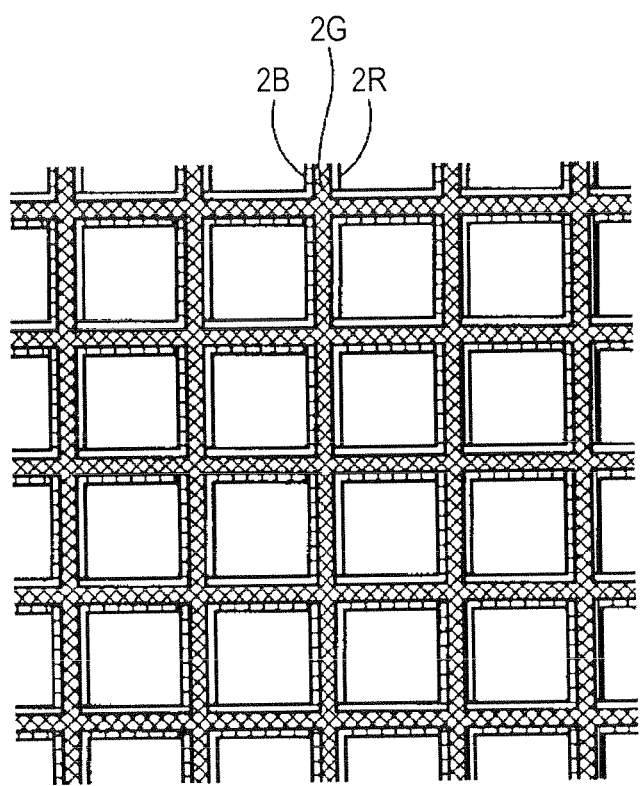
FIG. 9 is a diagram illustrating an example of an image when correction of a color aberration of magnification is performed on the image (RAW data) shown in FIG. 8 using a method of the related art.
Figure 10:
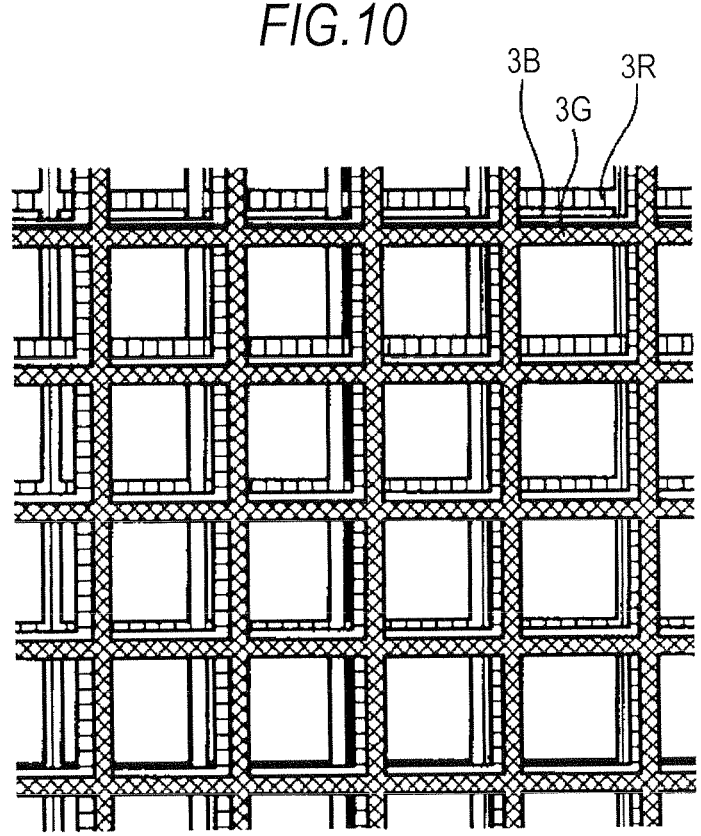
FIG. 10 is a diagram illustrating an example of an image when correction of a color aberration of magnification is performed on the image (RAW data) shown in FIG. 8 after color separation using the method of the related art.

FIG. 8 is a diagram illustrating an example of an image in which chromatic aberration of magnification occurs. FIG. 9 is a diagram illustrating an example (a first method of the related art) when the correction of the chromatic aberration of magnification is performed on the image (RAW data) shown in FIG. 8 before color separation in accordance with the method (see FIGS. 2A to 2C) of the related art. FIG. 10 is a diagram illustrating an example (a second method of the related art) when the correction of the chromatic aberration of magnification is performed on the image (RAW data) shown in FIG. 8 after color separation in accordance with the method (see FIGS. 2A to 2C) of the related art.

In the image shown in FIG. 8, edges 1R, 1G, and 1B of RGB originally overlap one another and the respective colors are synthesized to be a white color, when the chromatic aberration of magnification does not occur. However, since the chromatic aberration of magnification occurs in the image, the edge 1R of R and the edge 1B of B are considerably deviated with reference to the edge 1G of G. Here, L denotes an image center (corresponding to an optical axis).

In the image shown in FIG. 9, an edge 2G of G, an edge 2R of R, and an edge 2B of B are slightly deviated from each other due to the chromatic aberration of magnification, and thus the colors appear.

In the image shown in FIG. 10, the aberration correction is performed after the color separation, but the chromatic aberration of magnification of the edge 2R of R and the edge 2B of B with respect to the edge 2G of G is not corrected.

Figure 11:
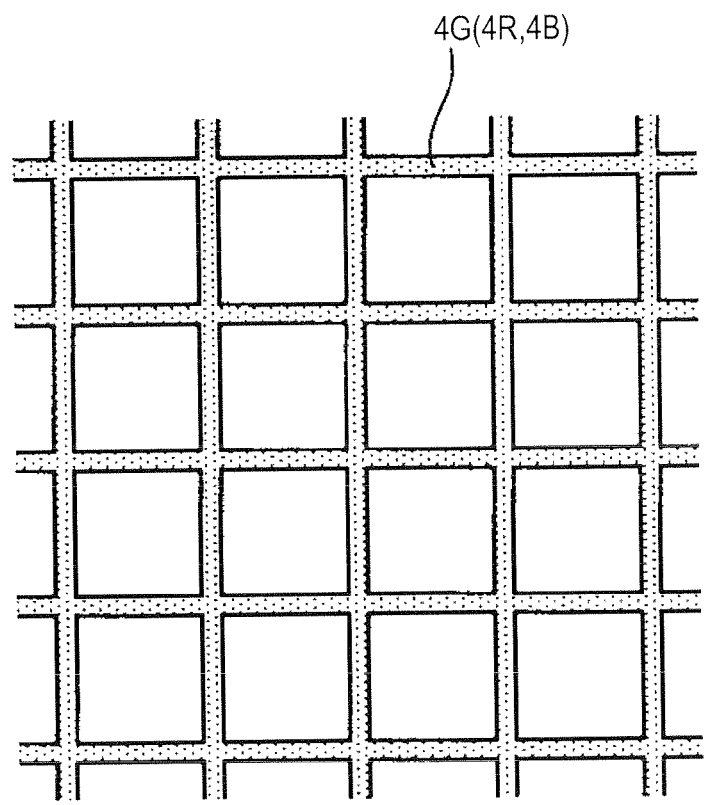
FIG. 11 is a diagram illustrating an example of an image when a method of correcting the color aberration of magnification according to the first example of the first embodiment is applied to the image (RAW data) shown in FIG. 8.

FIG. 11 is a diagram illustrating an example of an image when the method of correcting the chromatic aberration of magnification according to the first example of the first embodiment is applied to the image (RAW data) shown in FIG. 8.

In the image shown in FIG. 11, the edges 1R, 1G, and 1B of RGB overlap one another with high accuracy. Therefore, the colors of the respective edges are synthesized to exhibit a white color. That is, it can be said that the correction of the chromatic aberration of magnification is performed with high accuracy without blurring R or B (edges).

1.2. Example of Application to Double-Density Bayer Arrangement

Second Example

Next, a method of correcting chromatic aberration of magnification in a double-density Bayer Arrangement will be described according to a second example of the first embodiment. The double-density Bayer arrangement is formed by inclining the Bayer arrangement by 45 degrees.

Figure 12:
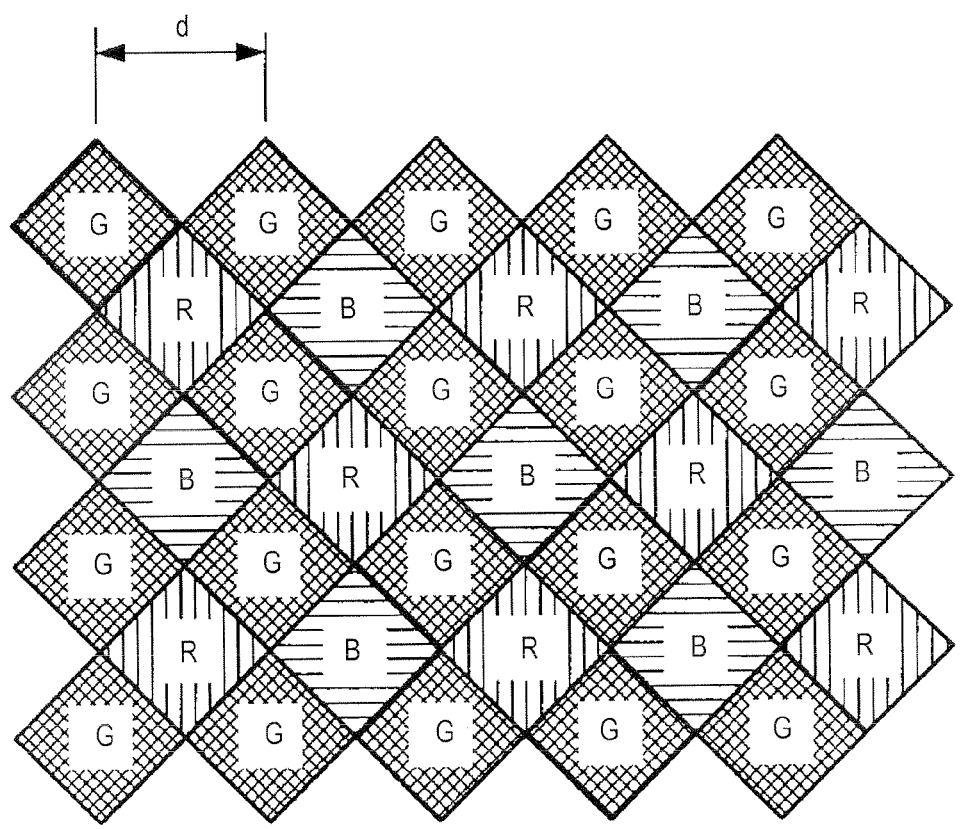
FIG. 12 is a diagram illustrating pixels of RGB colors disposed in a double-density Bayer arrangement.

FIG. 12 is a diagram illustrating the pixels of RGB colors disposed in the double-density Bayer arrangement. The number of output pixels is half of the number of input pixels (RAW data).

Figure 13:
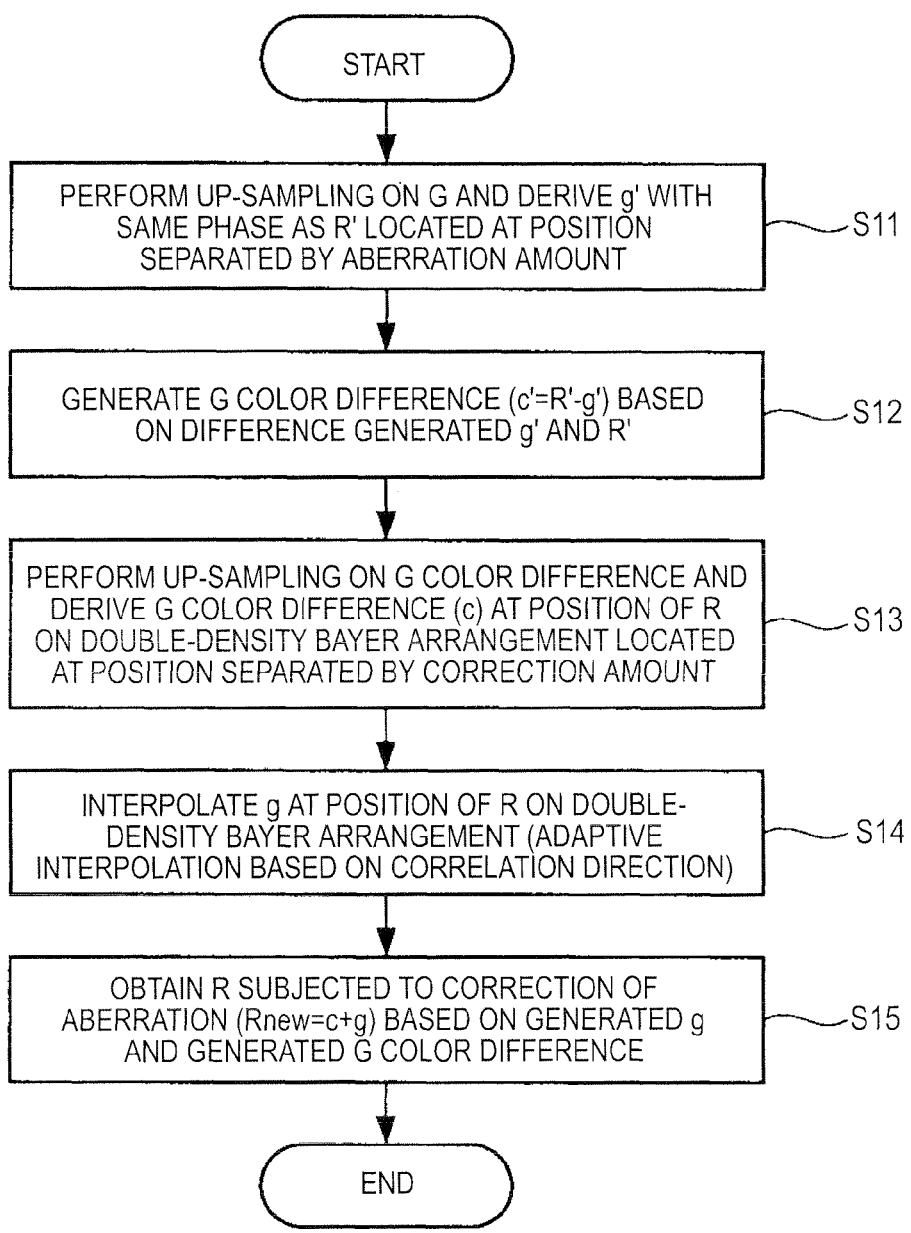
FIG. 13 is a flowchart illustrating a process of correcting a color aberration of magnification on a double-density Bayer arrangement according to a second example of the first embodiment.

FIG. 13 is a flowchart illustrating a process of correcting chromatic aberration of magnification in the double-density Bayer arrangement according to the second embodiment of the first embodiment. Hereinafter, a case in which the process of correcting the chromatic aberration of magnification on R of the double-density Bayer arrangement will be described.

As a presupposition of the process of correcting the chromatic aberration of magnification in FIG. 13, the R aberration amount generation unit 126R of the pre-processing unit 102 calculates a scaling magnification (aberration amount) of the R signal with reference to the G signal based on the color deviation amount and the distance from an image center (corresponding to an optical axis)

Next, the R G up-sampling processing unit 125 performs the up-sampling on the pixels (G' signals) of the G pixels in the vicinity of R' located at the deviated positions supplied from the R and B data switching unit 124 and derives the g' signal with the same phase as R' located at the position separated by the aberration amount from R (step S11)

Next, the subtracter 128 obtains a difference between the g' signal received from the PG up-sampling processing unit 125 and the R' signal received from the memory unit 127 and generates a G color difference (c'=R'−g') (step S12).

Next, the G color difference (R−G) up-sampling processing unit 131 performs the up-sampling on the G color difference (c') based on the R aberration amount data supplied from the R and B data switching unit 130 and derives the G color difference (c) at the original position of R located at the position separated by a correction amount (step S13).

Then, the correlation direction determination/G interpolation processing unit 122 generates an interpolation G signal (g) at the positions of the R pixels of the double-density Bayer arrangement (see FIG. 12) to be interpolated from G in the vicinity of the positions of the R pixels (step S14). At this time, the adaptive interpolation may be performed based on the correlation direction.

Finally, the adder 132 adds the g signal generated by the correlation direction determination/G interpolation processing unit 122 and the G color difference (c) generated by the G color difference (R−G) up-sampling processing unit 131 and performs pixel shift to obtain the R signal (Rnew=c+g) subjected to the correction of the chromatic aberration of magnification (step S15).

The chromatic aberration of magnification is corrected by performing pixel shift on all R on the double-density Bayer arrangement. The B signal (Bnew) corrected by the chromatic aberration of magnification is obtained also by performing the pixel shift on B.

In the second example of this embodiment, the correction of the chromatic aberration of magnification can be realized with high accuracy without blurring the pixels (for example, R or B) other than G, even when the correction of the chromatic aberration of magnification is performed on the image (RAW data) including a high-frequency component (edge) obtained from the image sensor with the double-density Bayer.

1.3. Example of Application to ClearVid Arrangement

Third Example

Next, a method of correcting chromatic aberration of magnification on a ClearVid (ClearVid: registered trademark) arrangement will be described according to a third example of the first embodiment.

Figure 14:
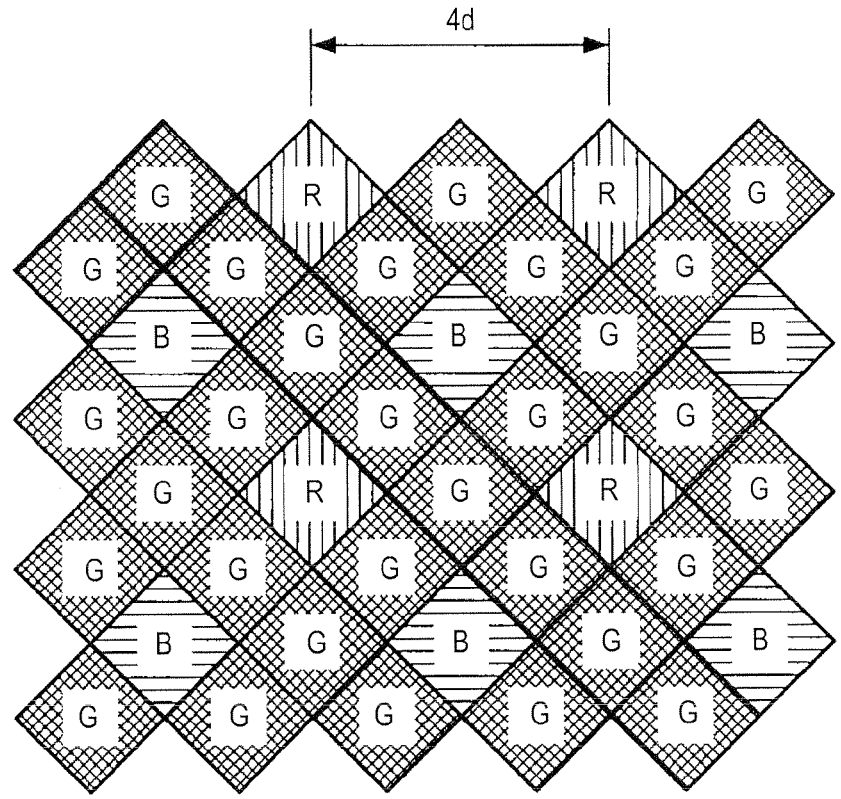
FIG. 14 is a diagram illustrating pixels (input pixels) of RGB colors disposed in a ClearVid arrangement.

FIG. 14 is a diagram illustrating pixels (input pixels) of RGB colors disposed in the ClearVid arrangement. The G pixels are six times the R or B pixels in number and are disposed to surround the R or B pixels in this arrangement (in which the G pixels are disposed at an interval of 2d and the R and B pixels are disposed at an interval of 4d in the horizontal and vertical directions).

Figure 15:
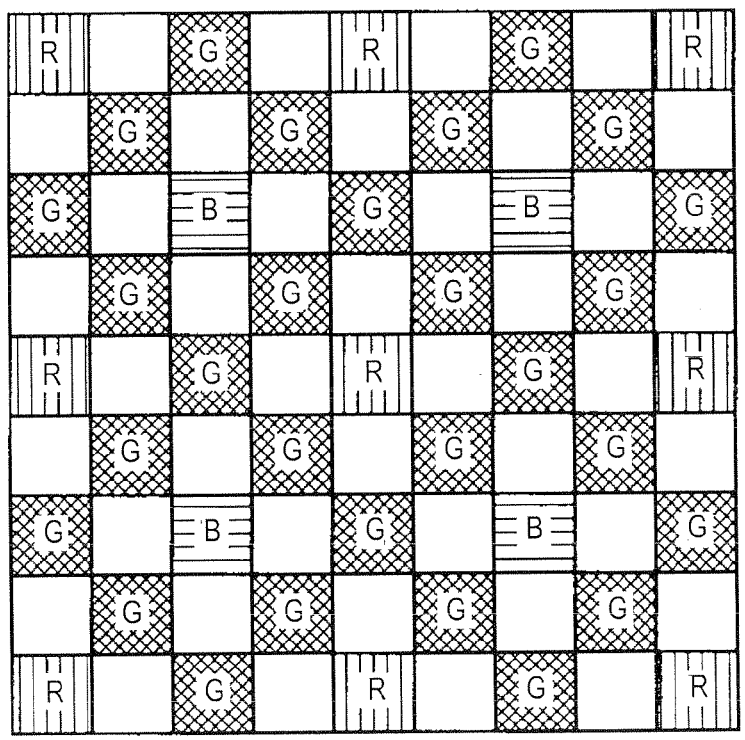
FIG. 15 is a diagram illustrating an image of output pixels of the pixels of RGB colors disposed in the ClearVid arrangement.

FIG. 15 is a diagram illustrating an image of output pixels of the pixels of RGB disposed in the ClearVid arrangement. The number of output pixels is twice the number the input pixels (RAW data).

Figure 16:
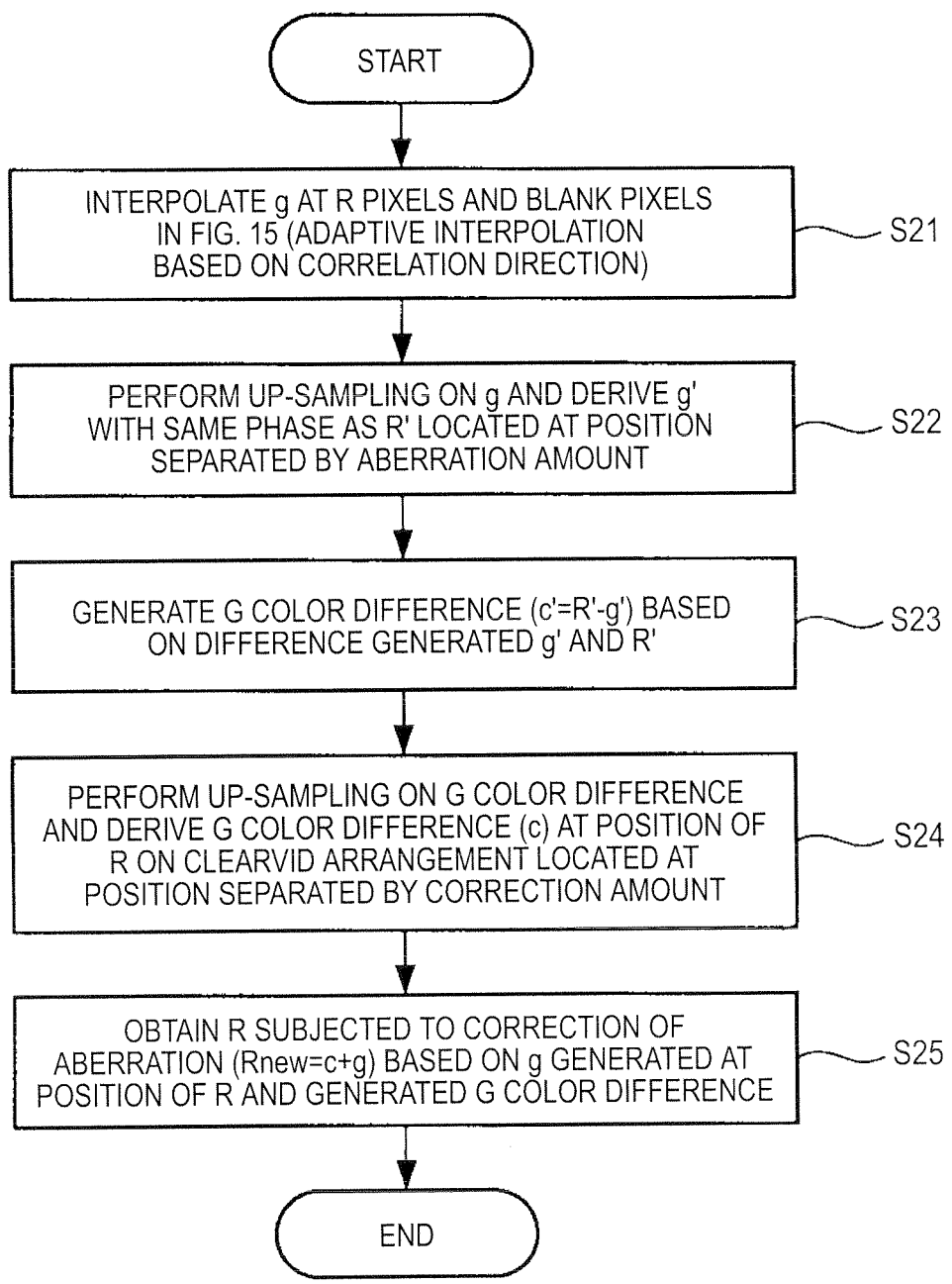
FIG. 16 is a flowchart illustrating a process of correcting chromatic aberration of magnification in the ClearVid arrangement according to a third example of the first embodiment.

FIG. 16 is a flowchart illustrating a process of correcting chromatic aberration of magnification in the ClearVid arrangement according to the third example of the first embodiment. Here, a case in which the process of correcting the chromatic aberration of magnification is performed on R of the ClearVid arrangement (output pixel) shown in FIG. 15 will be described.

As a presupposition of the process of correcting the chromatic aberration of magnification in FIG. 16, the R aberration amount generation unit 126R of the pre-processing unit 102 calculates a scaling magnification (aberration amount) of the R signal with reference to the G signal based on the color deviation amount and the distance from an image center (corresponding to an optical axis).

First, the correlation direction determination/G interpolation processing unit 122 generates an interpolation G signal (g) at the R pixels (see FIG. 15) and blank pixels of the ClearVid arrangement to be interpolated from G in the vicinity of the positions of the R pixels (step S21). At this time, the adaptive interpolation may be performed based on the correlation direction.

Next, the R G up-sampling processing unit 125 performs the up-sampling on the pixels (G' signals) of the G pixels in the vicinity of R' located at the deviated positions supplied from the R and B data switching unit 124 and derives the g' signal with the same phase as R' located at the position separated by the aberration amount (step S22).

Next, the subtracter 128 obtains a difference between the g' signal received from the R G up-sampling processing unit 125 and the R' signal received from the memory unit 127 and generates a G color difference (c'=R'−g') (step S23).

Then, the G color difference (R−G) up-sampling processing unit 131 performs the up-sampling on the G color difference (c') based on the R aberration amount data supplied from the R and B data switching unit 130 and derives the G color difference (c) at the original position of R located at the position separated by a correction amount (step S24).

Finally, the adder 132 adds the g signal generated by the correlation direction determination/G interpolation processing unit 122 and the G color difference (c) generated by the G color difference (R−G) up-sampling processing unit 131 and performs pixel shift to obtain the R signal (Rnew=c+g) subjected to the correction of the chromatic aberration of magnification (step S25).

The chromatic aberration of magnification is corrected by performing pixel shift on all R on the ClearVid arrangement. The B signal (Bnew) corrected by the chromatic aberration of magnification is obtained also by performing the pixel shift on B.

In the third example of this embodiment, the correction of the chromatic aberration of magnification can be realized with high accuracy without blurring the pixels (for example, R or B) other than G, even when the correction of the chromatic aberration of magnification is performed on the image (RAW data) including a high-frequency component (edge) obtained from the image sensor with the ClearVid arrangement.

2. Second Embodiment

When the color separation is performed simultaneously in the correction of the chromatic aberration of magnification, the color component signals of RGB are simultaneously output. Therefore, it is necessary to provide a block in which the G color difference is subjected to the up-sampling separately for R and B. Therefore, in a second embodiment, the pre-processing unit 102 (see FIG. 5) of the first embodiment includes a block having a color separation function.

[Example of Configuration of Pre-Processing Unit]

Figure 17:
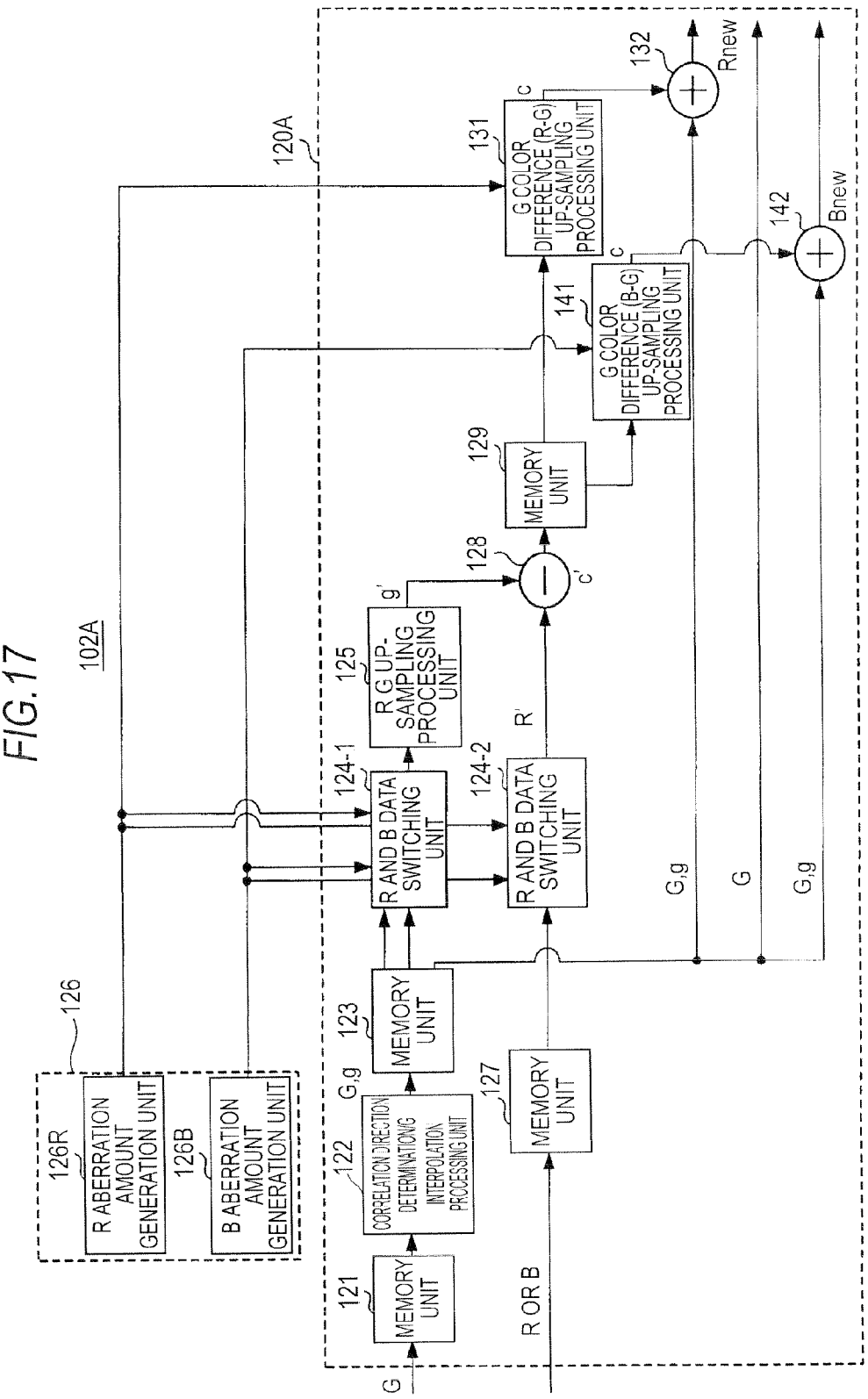
FIG. 17 is a block diagram illustrating the internal configuration of a pre-processing unit according to a second embodiment.

FIG. 17 is a block diagram illustrating the internal configuration of the pre-processing unit according to the second embodiment.

A pre-processing unit 102A is different from the pre-processing unit 102 of the first embodiment in that the correction unit 120A includes the R and B data switching unit 130 is not provided and a G color difference (B−G) up-sampling processing unit 141 and an adder 142. Hereinafter, the difference will be mainly described.

The G color difference (R−G) up-sampling processing unit 131 performs the up-sampling on the G color difference (c') read from the memory unit 129 based on the R aberration amount data supplied from the R aberration amount generation unit 126R and derives the G color difference (c) at the original position of R separated by the correction amount.

The G color difference (B−G) up-sampling processing unit 141 performs the up-sampling on the G color difference (c') read from the memory unit 129 based on the B aberration amount data supplied from the B aberration amount generation unit 126B and derives the G color difference (c) at the original position of B separated by the correction amount.

The adder 142 adds the g signal generated by the correlation direction determination/G interpolation processing unit 122 and the G color difference (c) generated by the G color difference (B−G) up-sampling processing unit 141 and performs the pixel shift to obtain a B signal (Bnew=c+g) subjected to the chromatic aberration of magnification.

2.1 Example of Application to Bayer Arrangement

First Example

Next, a method of correcting the chromatic aberration of magnification in accompaniment with the color separation will be described according to a first example of the second embodiment.

Figure 18:
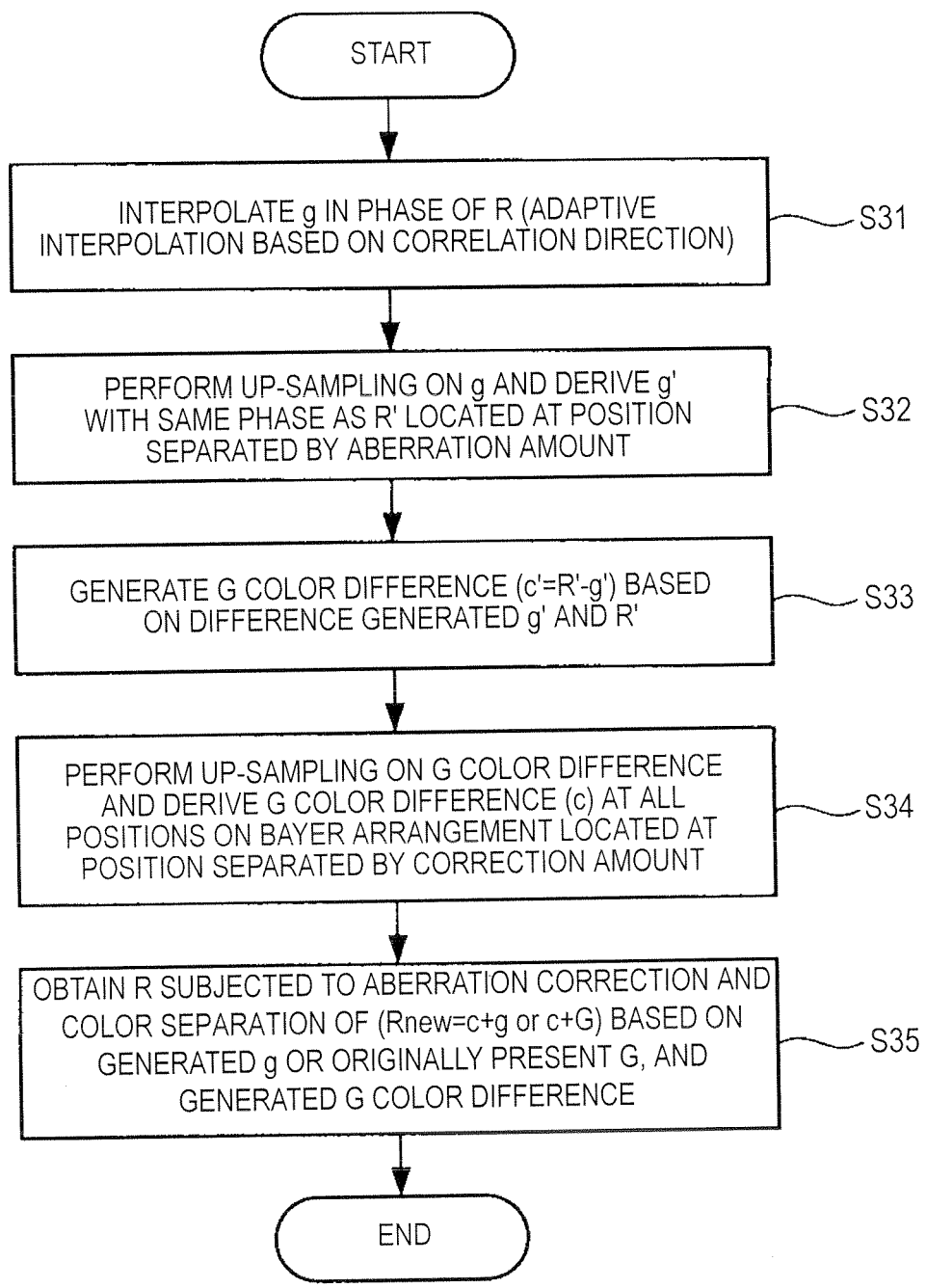
FIG. 18 is a flowchart illustrating a process of correcting a color aberration of magnification on a Bayer arrangement in accompaniment with color separation according to a first example of the second embodiment.

FIG. 18 is a flowchart illustrating the process of correcting the chromatic aberration of magnification in the Bayer arrangement in accompaniment with the color separation according to the first example of the second embodiment.

Hereinafter, a case in which the process of correcting the chromatic aberration of magnification in accompaniment with the color separation is performed on R of the Bayer arrangement will be described.

Since processes of step S31 to step S33 of FIG. 18 are the same as the processes of step S1 to step 33 of FIG. 6, the description thereof will not be repeated.

After the process of step S33 ends, the G color difference (R−G) up-sampling processing unit 131 performs the up-sampling on the G color difference (c') based on the R aberration amount data and derives the G color difference (c) at all of the positions located at the position separated by a correction amount on the Bayer arrangement (step S34).

Finally, the adder 132 adds the g signal generated by the correlation direction determination/G interpolation processing unit 122 or the G signal of G present originally on the Bayer arrangement and the G color difference (c) generated by the G color difference (R−G) up-sampling processing unit 131. Then, the adder 132 performs pixel shift to obtain the R signal (Rnew=c+g or c+G) subjected to the correction of the chromatic aberration of magnification and the color separation (step S35).

The pixel shift is performed on all of the positions to be output in addition to all of R on the Bayer arrangement, and the correction of the chromatic aberration of magnification and the color separation are performed. The pixel shift is performed also on B by the G color difference (B−G) up-sampling processing unit 141 and the adder 142 to obtain the B signal (Bnew) subjected to the correction of the chromatic aberration of magnification and the color separation.

Thus, the color separation can be also performed without use of a corrected Bayer arrangement by calculating the G color difference of all the positions to be output as well as the positions of R (B) on the Bayer arrangement, interpolating G at the positions, and adding to the interpolated G.

In the first example of this embodiment, the correction of the chromatic aberration of magnification can be realized with high accuracy without blurring the pixels (for example, R or B) other than G, even when the correction of the chromatic aberration of magnification and the color separation are performed on the image (RAW data) including a high-frequency component (edge) obtained from the image sensor with the Bayer arrangement.

2.2. Example of Application to Double-density Bayer Arrangement

Second Example

Next, a method of correcting chromatic aberration of magnification in accompaniment with the color separation will be described according to a second example of the second embodiment.

Figure 19:
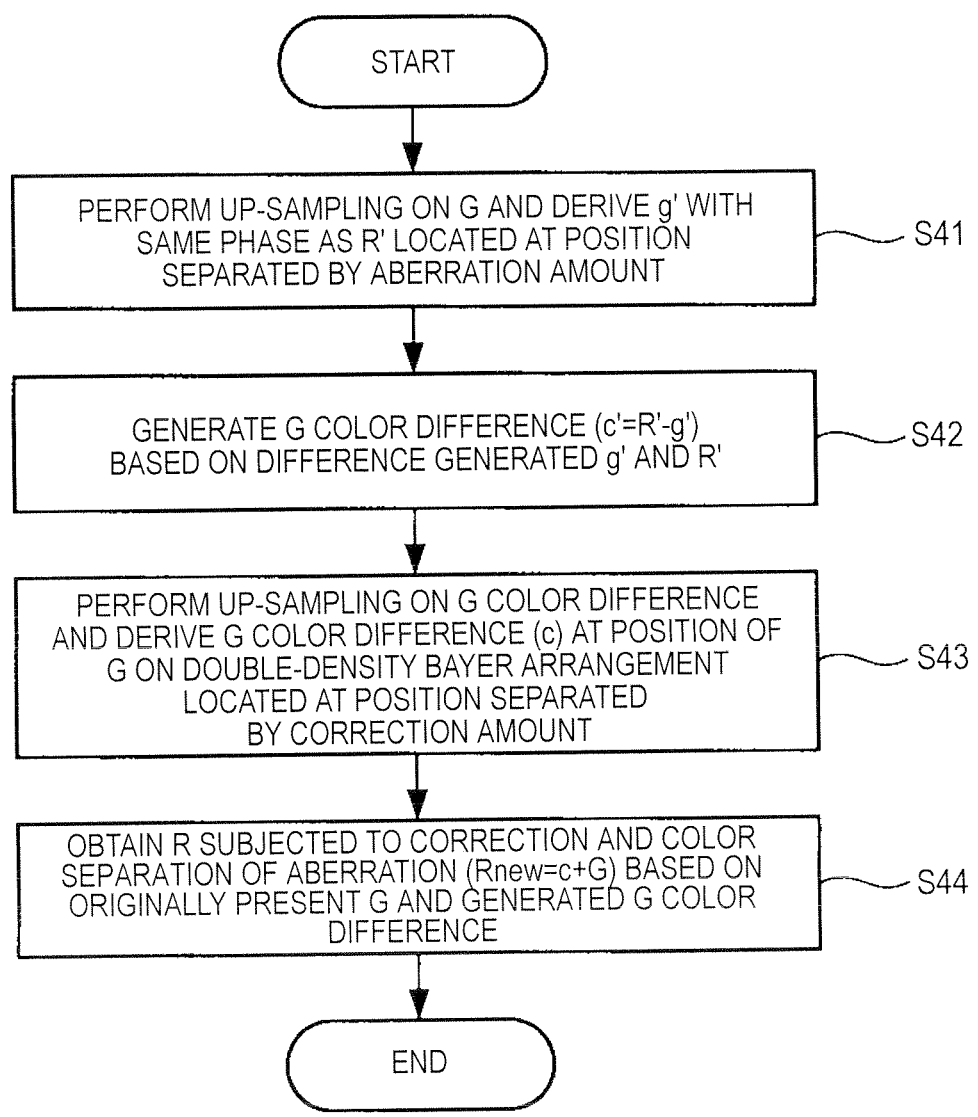
FIG. 19 is a flowchart illustrating a process of correcting a color aberration of magnification on a double-density Bayer arrangement in accompaniment with the color separation according to a second example of the second embodiment.

FIG. 19 is a flowchart illustrating the process of correcting the chromatic aberration of magnification in accompaniment with the color separation in the double-density Bayer arrangement according to the second example of the second embodiment.

Hereinafter, a case in which the process of correcting the chromatic aberration of magnification in accompaniment with the color separation on R of the double-density Bayer arrangement will be described.

Since processes of step S41 and step S42 of FIG. 19 are the same as the processes of step S11 and step S12 of FIG. 13, the description thereof will not be repeated.

After the process of step S42 ends, the G color difference (R−G) up-sampling processing unit 131 performs the up-sampling on the G color difference (c') based on the R aberration amount data and derives the G color difference (c) at the original position of G located at the position separated by a correction amount on the double-density Bayer arrangement (step S43). The G pixels are half of the pixels of the RAW data. Therefore, when the G pixels are used without correction, it is not necessary to interpolate G.

Finally, the adder 132 adds the G signal of G present originally on the double-density Bayer arrangement and the G color difference (c) generated by the G color difference (R−G) up-sampling processing unit 131. The adder 132 performs pixel shift to obtain the R signal (Rnew=c+G) subjected to the correction of the chromatic aberration of magnification and the color separation (step S44).

The pixel shift is performed on all of the positions to be output in addition to all of R on the double-density Bayer arrangement, and the correction of the chromatic aberration of magnification and the color separation are performed. The pixel shift is performed also on B by the G color difference (B−G) up-sampling processing unit 141 and the adder 142 to obtain the B signal (Bnew) subjected to the correction of the chromatic aberration of magnification and the color separation.

In the second example of this embodiment, the correction of the chromatic aberration of magnification can be realized with high accuracy without blurring the pixels (for example, R or B) other than G, even when the correction of the chromatic aberration of magnification and the color separation are performed on the image (RAW data) including a high-frequency component (edge) obtained from the image sensor with the double-density Bayer.

2.3. Example of Application to ClearVid Arrangement

Third Example

Next, a method of correcting chromatic aberration of magnification in accompaniment with the color separation will be described according to a third example of the second embodiment.

Figure 20:
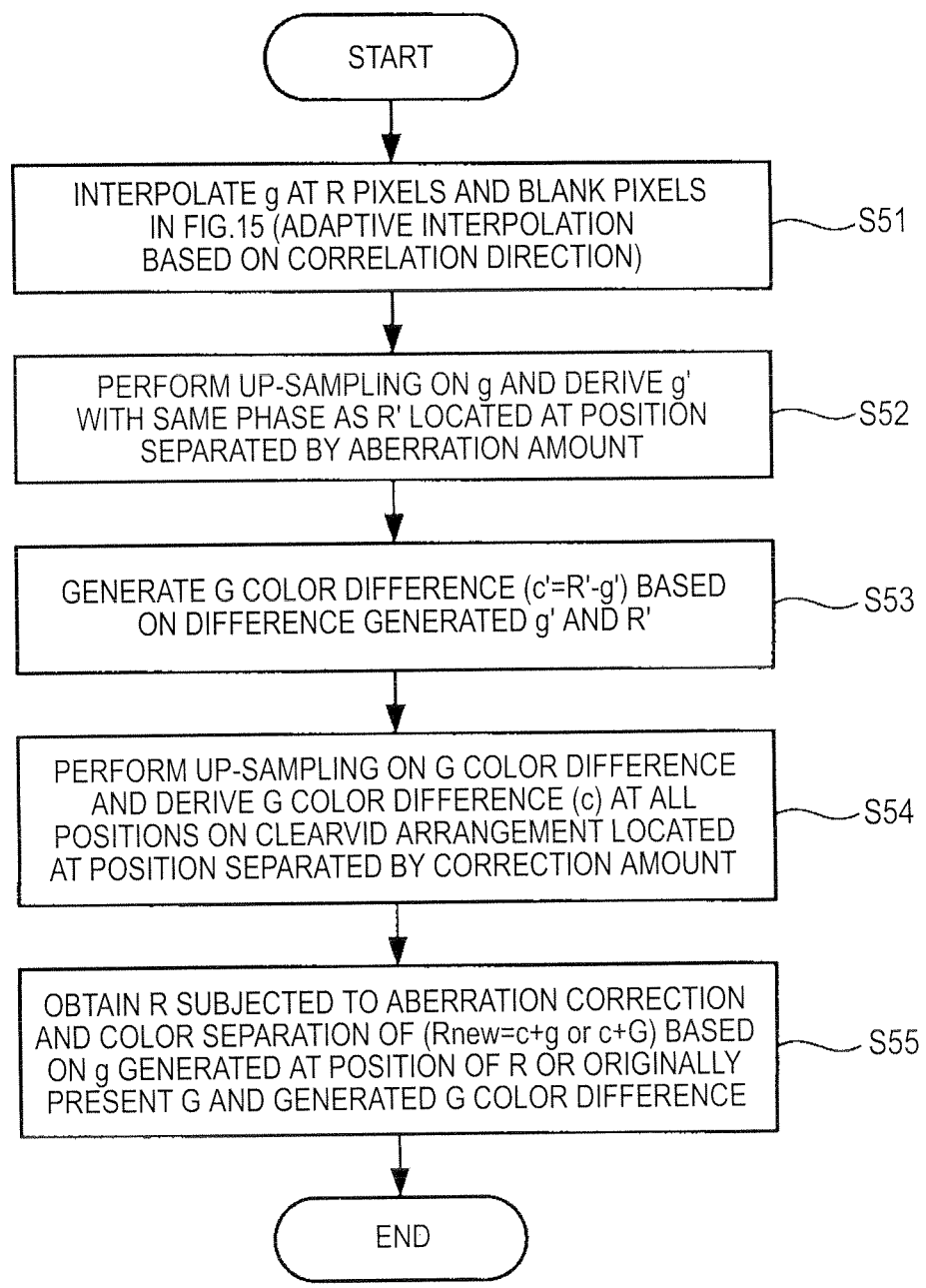
FIG. 20 is a flowchart illustrating a process of correcting chromatic aberration of magnification in the ClearVid arrangement in accompaniment with the color separation according to a third example of the second embodiment.

FIG. 20 is a flowchart illustrating a process of correcting chromatic aberration of magnification in the ClearVid arrangement in accompaniment with the color separation according to the third example of the second embodiment.

Hereinafter, a case in which the process of correcting the chromatic aberration of magnification on R of the ClearVid arrangement in accompaniment with the color separation will be described.

Since processes of step S51 to step S53 of FIG. 20 are the same as the processes of step S21 to step S23 of FIG. 16, the description thereof will not be repeated.

After the process of step S53 ends, the G color difference (R−G) up-sampling processing unit 131 performs the up-sampling on the G color difference (c') based on the R aberration amount data and derives the G color difference (c) at all of the positions on the ClearVid arrangement located at the position separated by a correction amount (step S54).

Finally, the adder 132 adds the g signal generated by the correlation direction determination/G interpolation processing unit 122 or the G signal of G present originally on the ClearVid arrangement and the G color difference (c) generated by the G color difference (R−G) up-sampling processing unit 131. Then, the adder 132 performs pixel shift to obtain the R signal (Rnew=c+g or c+G) subjected to the correction of the chromatic aberration of magnification and the color separation (step S55).

In the third example of this embodiment, the correction of the chromatic aberration of magnification can be realized with high accuracy without blurring the pixels (for example, R or B) other than G, even when the correction of the chromatic aberration of magnification and the color separation are performed on the image (RAW data) including a high-frequency component (edge) obtained from the image sensor with the ClearVid arrangement.

The series of processes according to the first and second embodiments described above may be executed by hardware, but also may be executed by software. When the series of processes are executed by software, the series of processes can be executed by a computer in which a program for the software is embedded in dedicated hardware or a computer in which a program executing various functions is installed.

A recording medium (for example, the memory 107 or the recording device in FIG. 4) recording program codes of the software executing the functions of the above-described embodiments may be provided in a system or an apparatus. Further, the functions can be, of course, executed by reading and executing the programs codes of the recording medium by a computer (or a control device such as a CPU) of the system or the apparatus.

In this case, examples of the recording medium used to supply the program codes include a flexible disk, a hard disk, an optical disc, a magneto-optical disc, a CD-ROM, a CD-R, a magnetic tape, a non-volatile memory card, and a ROM.

The functions of the above-described embodiment can be realized by executing the program codes read by the computer. Further, an OS or the like operating on the computer executes some or all of the actual processes in response to the instructions of the program codes. A case in which the functions of the above-described embodiments are realized by the processes is also included.

In the specification, processing steps describing the chronological processes include not only processes performed chronologically in the described order but also processes (for example, processes performed in parallel or processes performed by objects), which are not executed chronologically, but are performed in parallel or separately.

The embodiments of the present technology may be implemented as the following configurations.

(1) An image processing apparatus including: an aberration amount generation unit that calculates an aberration amount of a different color component signal with reference to a position of a color component signal of a criterion color having pixels larger in number than a different color included in image data, based on a luminance value of a pixel signal included in the image data; and a correction unit that generates a color difference signal from the different color component signal and the color component signal of the criterion color and corrects chromatic aberration of the color component signal of the different color present between pixels of the criterion color using the color difference signal based on the aberration amount.

(2) The image processing apparatus described in (1) wherein the correction unit includes a criterion color interpolation processing unit that interpolates the color component signal of the criterion color at a position of a pixel of the different color present between the pixels of the criterion color, a criterion up-sampling processing unit that performs up-sampling on the interpolated color component signal of the criterion color based on the aberration amount; a color difference generation unit that generates a color difference signal by obtaining a difference between the different component signal and the interpolated color component signal of the criterion color subjected to the up-sampling; a color difference up-sampling processing unit that performs up-sampling on the color difference signal based on the aberration amount; and a corrected color component signal generation unit that generates the corrected color component signal in the pixel of the different color by adding the interpolated color component signal of the criterion color and the color difference signal subjected to the up-sampling.

(3) The image processing apparatus described in (2) wherein the image data is color image data obtained from a single-plate image sensor.

(4) The image processing apparatus described in (3) wherein the color component signal of the criterion color is a green signal and the different color component signal is a red or blue signal.

(5) The image processing apparatus described in (1) wherein the correction unit includes a criterion color interpolation processing unit that interpolates the color component signal of the criterion color at a position of a pixel of a first or second color present between the pixels of the criterion color, a criterion up-sampling processing unit that performs up-sampling on the interpolated first or second color component signal of the criterion color based on the aberration amount of a first or second color component signal calculated by the aberration amount generation unit; a color difference generation unit that generates a first or second color difference signal by obtaining a difference between the first or second color component signal and the interpolated first or second color component signal of the criterion color subjected to the up-sampling; a first color difference up-sampling processing unit performs up-sampling on the first color difference signal based on the aberration amount of the first color component signal; a second color difference up-sampling processing unit performs up-sampling on the second color difference signal based on the aberration amount of the second color component signal; a first corrected color component signal generation unit that generates the corrected color component signal in the pixel of the first color by adding the interpolated first color component signal of the criterion color and the first color difference signal subjected to the up-sampling; and a second corrected color component signal generation unit that generates the corrected color component signal in the pixel of the second color by adding the interpolated second color component signal of the criterion color and the second color difference signal subjected to the up-sampling.

(6) An imaging apparatus including: a single-plate type image sensor that has pixels of a criterion color larger than a different color in number; an aberration amount generation unit that calculates an aberration amount of a different color component signal with reference to a position of a color component signal of a criterion color included in image data obtained from the image sensor, based on a luminance value of a pixel signal included in the image data; and a correction unit that generates a color difference signal from the different color component signal and the color component signal of the criterion color and corrects chromatic aberration of the color component signal of the different color present between pixels of the criterion color using the color difference signal based on the aberration amount.

(7) An image processing method including: calculating an aberration amount of a different color component signal based on a luminance value of a pixel signal included in image data with reference to a position of a color component signal of a criterion color having pixels larger in number than a different color included in the image data; generating a color difference signal from the different color component signal and the color component signal of the criterion color; and correcting chromatic aberration of the color component signal of the different color present between pixels of the criterion color using the color difference signal based on the aberration amount.

(8) A program causing a computer to execute processes of: calculating an aberration amount of a different color component signal based on a luminance value of a pixel signal included in image data with reference to a position of a color component signal of a criterion color having pixels larger in number than a different color included in the image data; generating a color difference signal from the different color component signal and the color component signal of the criterion color; and correcting chromatic aberration of the color component signal of the different color present between pixels of the criterion color using the color difference signal based on the aberration amount.

The preferred embodiments of the present technology have hitherto been described with reference to the accompanying drawings, but the present technology is not limited thereto. It is apparent to those skilled in the art of the present technology that the embodiments of the present technology are modified or corrected in various ways within the scope of the technical spirit described in the appended claims, and the modifications and corrections of course pertain to the technical scope of the present technology.

For example, a case has hitherto been described in which the Bayer arrangement, the double-density Bayer arrangement, or the ClearVid arrangement is used in the image processing according to the above-described embodiments, but may be applied to a pixel arrangement other than these arrangements. Specifically, when a color deviation is detected, the reference position of the G signal used in the interpolation of the G signal is dependent on the pixel arrangement other than these arrangement. When the interpolation is performed, the reference position of the R or B signal used in the interpolation of the R or B signal is dependent on the pixel arrangement other than these arrangements.

A case has hitherto been described in which the image processing of the above-described embodiments is performed in the imaging apparatus 100. However, the present technology is not limited thereto. For example, the RAW data acquired through the imaging of the imaging apparatus may be output to the outside and the image processing of the above-described embodiments may be applied to, for example, a television receiver or a personal computer.

The present disclosure contains subject matter related to that disclosed in Japanese Priority Patent Application JP 2011-150401 filed in the Japan Patent Office on Jul. 6, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
an aberration amount generation unit that calculates an aberration amount of a different color component signal with reference to a position of a color component signal of a criterion color having pixels larger in number than a different color included in image data, based on a luminance value of a pixel signal included in the image data;
a correction unit that generates a color difference signal from the different color component signal and the color component signal of the criterion color and corrects chromatic aberration of the color component signal of the different color present between pixels of the criterion color using the color difference signal based on the aberration amount, wherein the correction unit includes
a criterion color interpolation processing unit that interpolates the color component signal of the criterion color at a position of a pixel of a first or second color present between the pixels of the criterion color;
a criterion up-sampling processing unit that performs up-sampling on the interpolated first or second color component signal of the criterion color based on the aberration amount of a first or second color component signal calculated by the aberration amount generation unit;
a color difference generation unit that generates a first or second color difference signal by obtaining a difference between the first or second color component signal and the interpolated first or second color component signal of the criterion color subjected to the up-sampling;
a first color difference up sampling processing unit performs up-sampling on the first color difference signal based on the aberration amount of the first color component signal;
a second color difference up-sampling processing unit performs up-sampling on the second color difference signal based on the aberration amount of the second color component signal;
a first corrected color component signal generation unit that generates the corrected color component signal in the pixel of the first color by adding the interpolated first color component signal of the criterion color and the first color difference signal subjected to the up-sampling; and
a second corrected color component signal generation unit that generates the corrected color component signal in the pixel of the second color by adding the interpolated second color component signal of the criterion color and the second color difference signal subjected the up-sampling.

2. The image processing apparatus according to claim 1, wherein the image data is color image data obtained from a single-plate image sensor.

3. The image processing apparatus according to claim 2, wherein the color component signal of the criterion color is a green signal and the different color component signal is a red or blue signal.

4. An imaging apparatus comprising:
a single-plate type image sensor that has pixels of a criterion color larger than a different color in number;
an aberration amount generation unit that calculates an aberration amount of a different color component signal with reference to a position of a color component signal of a criterion color included in image data obtained from the image sensor, based on luminance value of a pixel signal included in the image data;
a correction unit that generates a color difference signal from front the different color component signal and the color component signal of the criterion color and corrects chromatic aberration of the color component signal, of the different color present between pixels of the criterion color using the color difference signal based on aberration amount, wherein the correction unit includes
a criterion color interpolation processing unit that interpolates the color component signal of the criterion color at a position of a pixel of a first or second color present between the pixels of the criterion color;

a criterion up-sampling processing unit that performs up-sampling on the interpolated first or second color component signal of the criterion color based on the aberration amount of a first or second color comment signal calculated by the aberration amount generation unit;

a color difference generation unit that generates a first or second color difference signal by obtaining a difference between the first or second color component signal and the interpolated first or second colon component signal of the criterion color subjected to the up-sampling;

a first color difference up-sampling processing unit performs up-sampling on the first color difference signal based on the aberration amount of the first color component signal;

a second color difference up-sampling processing unit performs up-sampling on the second color difference signal based on the aberration amount of the second color component signal;

a first corrected color component signal generation unit that generates the corrected color component signal in the pixel of the first color by adding the interpolated first color component signal of the criterion color and the first color difference signal subjected to the up-sampling; and a second corrected color component signal generation unit that generates the corrected color component signal in the pixel of the second color by adding the interpolated second color component signal of the criterion color and the second color difference signal subjected to the up-sampling.

5. An image processing method comprising the steps of:

calculating an aberration amount of a different color component signal based on a luminance value of a pixel signal included in image data with reference to a position of a color component signal of a criterion color having pixels larger in number than a different color included in the image data;

generating a color difference signal from the different color component signal and the color component signal of the criterion color;

correcting chromatic aberration of the color component signal of the different color present between pixels of the criterion color using the color difference signal based on the aberration amount, where the correction unit includes interpolating the color component signal of the criterion color at a position of a pixel of a first or second color preen between the pixels of the criterion color;

performing up-sampling on the interpolated first or second color component signal of the criterion color based on the aberration amount of a first or second color component signal calculated by the aberration amount calculating step;

generating a first or second color difference signal by obtaining a difference between the first or second color component signal and the interpolated first or second color component signal of the criterion color subjected to the up-sampling;

performing up-sampling on the first color difference signal based on the aberration amount of the first color component signal;

performing up-sampling on the second color difference signal based on the aberration amount of the second color component signal;

generating the corrected color component signal in the pixel of the first color by adding the interpolated first color component signal of the criterion color and the first color difference signal subjected to the up-sampling; and generating the corrected color component signal in the pixel of the second color by adding the interpolated second color component signal of the criterion color and the second color difference signal subjected to the up-sampling.

6. A computer program embodied on a non-transitory computer readable medium causing a computer to execute processes of:

calculating an aberration amount of a different color component signal based on a luminance value of a pixel signal included in image data with reference to a position of a color component signal of a criterion color having pixels larger in number than different color included in the image data; generating a color difference signal from the different color component signal and the color component signal of the criterion color; correcting chromatic aberration of the color component signal of the different color present between pixels of the criterion color using the color difference signal based on the aberration amount, wherein the correction unit includes interpolating the color component signal of the criterion color at a position of a pixel of a first or second color present between the pixels of the criterion color; performing up-sampling on the interpolated first or second color component signal of the criterion color based on the aberration amount of a first or second color component signal calculated by the aberration amount calculating step; generating a first or second color difference signal by obtaining a difference between the first or second color component signal and the interpolated first or second color component signal of the criterion color subjected to the up-sampling; performing up-sampling on the first color difference signal based on the aberration amount of the first color component signal; performing up-sampling on the second color difference signal based on the aberration amount of the second color component signal; generating the corrected color component signal in the pixel of the first color by adding the interpolated first color component signal of the criterion color and the first color difference signal subjected to the up-sampling; and generating the corrected color component signal in the pixel of the second color by adding the interpolated second color component signal of the criterion color and the second color difference signal subjected to the up-sampling.

* * * * *